US010158559B2

(12) United States Patent
Luo et al.

(10) Patent No.: US 10,158,559 B2
(45) Date of Patent: Dec. 18, 2018

(54) CAPACITY-AWARE HEURISTIC APPROACH FOR PLACING SOFTWARE-DEFINED NETWORKING (SDN) SWITCHES IN HYBRID SDN NETWORKS FOR SINGLE LINK/NODE FAILURE

(71) Applicant: Futurewei Technologies, Inc., Plano, TX (US)

(72) Inventors: Min Luo, Cumming, GA (US); Cing-Yu Chu, Brooklyn, NY (US); Kang Xi, Morganville, NJ (US); Hung-Hsiang Jonathan Chao, Holmdel, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 126 days.

(21) Appl. No.: 14/997,794

(22) Filed: Jan. 18, 2016

(65) Prior Publication Data

US 2016/0226701 A1 Aug. 4, 2016

Related U.S. Application Data

(60) Provisional application No. 62/109,495, filed on Jan. 29, 2015.

(51) Int. Cl.
*H04L 12/24* (2006.01)
*H04L 12/707* (2013.01)
(Continued)

(52) U.S. Cl.
CPC ............ *H04L 45/22* (2013.01); *H04L 41/022* (2013.01); *H04L 41/0836* (2013.01);
(Continued)

(58) Field of Classification Search
CPC ..... H04L 41/0803; H04L 41/20; H04L 67/28; H04L 63/0428; H04L 63/0272;
(Continued)

(56) References Cited

U.S. PATENT DOCUMENTS

2011/0286324 A1* 11/2011 Bellagamba ........ H04L 41/0677 370/219
2014/0149542 A1 5/2014 Luo et al.
(Continued)

*Primary Examiner* — Jung Liu
(74) *Attorney, Agent, or Firm* — Conley Rose, P.C.

(57) ABSTRACT

A network controller comprising a processor configured to obtain topology information of a network, wherein the topology information indicates a plurality of non-software-defined networking (non-SDN) network elements (NEs) interconnected by a plurality of links in the network, analyze each non-SDN NE according to the topology information to determine whether the non-SDN NE is a candidate NE for establishing a backup tunnel to protect a single-link failure at one of the plurality of links, and select a plurality of target NEs from the candidate NEs to protect against all single link-failures in the network, and a transmitter coupled to the processor and configured to send a first message to a first of the target NEs to dynamically enable software-defined networking (SDN) functionalities at the first target NE in order to facilitate single-link failure protection in the network.

20 Claims, 16 Drawing Sheets

100

110
SDN Controller
151
151
121
D
130
C
120
130
130
121
E
130
120
130
120
141
A
B
142

(51) Int. Cl.

| | |
|---|---|
| ***H04L 12/751*** | (2013.01) |
| ***H04L 12/703*** | (2013.01) |
| *H04L 12/733* | (2013.01) |
| *H04L 12/715* | (2013.01) |

(52) U.S. Cl.
CPC .............. *H04L 41/12* (2013.01); *H04L 45/02* (2013.01); *H04L 45/28* (2013.01); *H04L 45/122* (2013.01); *H04L 45/64* (2013.01)

(58) Field of Classification Search
CPC . H04L 67/16; H04L 41/5054; H04L 41/0806; H04L 12/12; H04Q 2011/0086; H04Q 2011/0016; H04Q 2011/0073; H04Q 11/0066; H04Q 2011/0077; H04W 12/00; H04W 12/02
See application file for complete search history.

(56) References Cited

U.S. PATENT DOCUMENTS

2014/0280834 A1* 9/2014 Medved ................ H04L 47/122 709/223
2014/0280900 A1* 9/2014 McDowall ............. H04L 41/12 709/224
2015/0163152 A1* 6/2015 Li ....................... H04L 47/2441 370/409
2015/0195190 A1* 7/2015 Shah Heydari ......... H04L 45/22 714/47.3
2015/0304158 A1* 10/2015 Dharmadhikari ..... H04L 41/046 714/37
2015/0312658 A1* 10/2015 Winzer ............. H04Q 11/0005 398/5
2015/0326426 A1 11/2015 Luo et al.
2016/0150448 A1* 5/2016 Perras ................... H04W 36/12 455/450
2016/0294734 A1* 10/2016 Jang .................... H04L 41/0654

* cited by examiner

320

| Link Failure | Node Locations | | | | |
|---|---|---|---|---|---|
| | A | B | C | D | E |
| A → B | 1 | 0 | 0 | 1 | 1 |
| B → A | 0 | 1 | 1 | 1 | 0 |
| B → C | 1 | 1 | 0 | 0 | 1 |
| C → B | 0 | 0 | 1 | 1 | 1 |
| ... | ... | ... | ... | ... | ... |

330

| Link Failure | Node Locations | | | | | |
|---|---|---|---|---|---|---|
| | A | B | C | D | E | Sum |
| A → B | 1 | 0 | 0 | 1 | 1 | 1 |
| B → A | 0 | 1 | 1 | 1 | 0 | 1 |
| B → C | 1 | 1 | 0 | 0 | 1 | 2 |
| C → B | 0 | 0 | 1 | 1 | 1 | 0 |
| ... | ... | ... | ... | ... | ... | |

340

| Link Failure | Node Locations | | | | | |
|---|---|---|---|---|---|---|
| | A | B | C | D | E | Sum |
| A → B | 1 | 0 | 0 | 1 | 1 | 2 |
| B → A | 0 | 1 | 1 | 1 | 0 | 1 |
| B → C | 1 | 1 | 0 | 0 | 1 | 2 |
| C → B | 0 | 0 | 1 | 1 | 1 | 2 |
| ... | ... | ... | ... | ... | ... | |

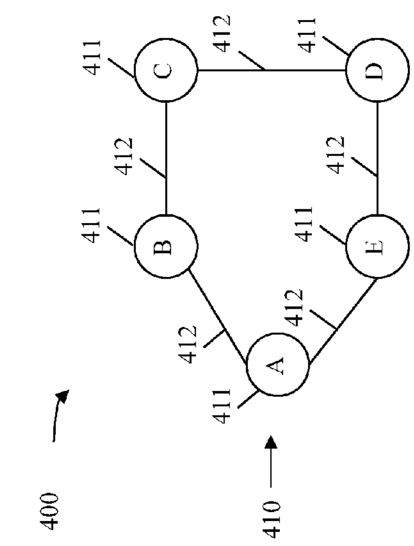
FIG. 4A
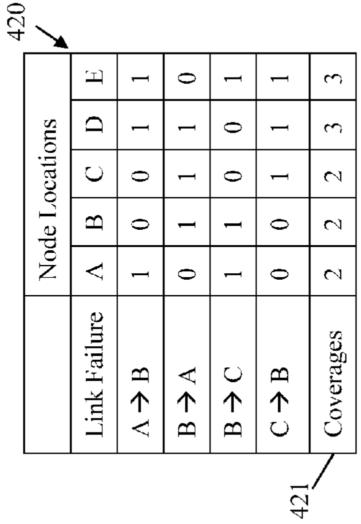
| | Node Locations | | | | |
|---|---|---|---|---|---|
| Link Failure | A | B | C | D | E |
| A → B | 1 | 0 | 0 | 1 | 1 |
| B → A | 0 | 1 | 1 | 1 | 0 |
| B → C | 1 | 1 | 0 | 0 | 1 |
| C → B | 0 | 0 | 1 | 1 | 1 |
| Coverages | 2 | 2 | 2 | 3 | 3 |
FIG. 4B
430
| | Node Locations | | | | |
|---|---|---|---|---|---|
| Link Failure | A | B | C | D | E |
| A → B | 1 | 0 | 0 | 1 | 1 |
| B → A | 0 | 1 | 1 | 1 | 0 |
| B → C | 1 | 1 | 0 | 0 | 1 |
| C → B | 0 | 0 | 1 | 1 | 1 |
| Coverages | 2 | 2 | 2 | 3 | 3 |
431 432 433 434 435 437 437
FIG. 4C
440
| | Node Locations | | | | |
|---|---|---|---|---|---|
| Link Failure | A | B | C | D | E |
| A → B | 1 | 0 | 0 | 1 | 1 |
| B → A | 0 | 1 | 1 | 1 | 0 |
| B → C | 1 | 1 | 0 | 0 | 1 |
| C → B | 0 | 0 | 1 | 1 | 1 |
| Coverages | 2 | 2 | 2 | 3 | 3 |
431 432 433 434 435 436 437 437
FIG. 4D

|  | Node Locations | | | | |
|---|---|---|---|---|---|
| Link Failure | A | B | C | D | E |
| A → B | 4 | 0 | 0 | 1 | 2 |
| B → A | 0 | 4 | 4 | 3 | 0 |
| B → C | 1 | 4 | 0 | 0 | 1 |
| C → B | 0 | 0 | 4 | 3 | 1 |
| Coverages | 2 | 2 | 2 | 3 | 3 |
| Link-Capacity Weights | 5 | 8 | 8 | 7 | 4 |

530

|  | Node Locations | | | | |
|---|---|---|---|---|---|
| Link Failure | A | B | C | D | E |
| A → B | 4 | 0 | 0 | 1 | 2 |
| B → A | 0 | 4 | 4 | 3 | 0 |
| B → C | 1 | 4 | 0 | 0 | 1 |
| C → B | 0 | 0 | 4 | 3 | 1 |
| Coverage | 2 | 2 | 2 | 3 | 3 |
| Link-Capacity Weights | 5 | 8 | 8 | 7 | 4 |

533 534 535 537 531 532

540

|  | Node Locations | | | | |
|---|---|---|---|---|---|
| Link Failure | A | B | C | D | E |
| A → B | 4 | 0 | 0 | 1 | 2 |
| B → A | 0 | 4 | 4 | 3 | 0 |
| B → C | 1 | 4 | 0 | 0 | 1 |
| C → B | 0 | 0 | 4 | 3 | 1 |
| Coverage | 1 | 1 | 0 | x | 1 |
| Link-Capacity Weights | 1 | 4 | 0 | x | 1 |

533 534 536 535 537 538 531

620

| Node ID | 0 | 1 | 2 | 3 | 4 | 5 | 6 | 7 | 8 | 9 | 10 | 11 | **12** | 13 |
|---|---|---|---|---|---|---|---|---|---|---|---|---|---|---|
| Coverages | 25 | 24 | 24 | 22 | 23 | 24 | 26 | 22 | 26 | 25 | 26 | 25 | **28** | 27 |
| Link-Capacity Weights | 49 | 56 | 56 | 38 | 37 | 50 | 48 | 36 | 60 | 48 | 47 | 33 | **52** | 35 |

| Node ID | 0 | 1 | 2 | 3 | 4 | **5** | 6 | 7 | 8 | 9 | 10 | 11 | **12** | 13 |
|---|---|---|---|---|---|---|---|---|---|---|---|---|---|---|
| Coverages | 6 | 7 | 8 | 10 | 9 | **12** | 7 | 7 | 10 | 6 | 9 | 3 | **x** | 11 |
| Link-Capacity Weights | 10 | 14 | 17 | 15 | 13 | **25** | 13 | 10 | 22 | 10 | 15 | 4 | **x** | 15 |

| Node ID | 0 | 1 | 2 | **3** | 4 | **5** | 6 | 7 | 8 | 9 | 10 | 11 | **12** | 13 |
|---|---|---|---|---|---|---|---|---|---|---|---|---|---|---|
| Coverages | 1 | 1 | 0 | **2** | 0 | **x** | 1 | 2 | 1 | 2 | 2 | 0 | **x** | 0 |
| Link-Capacity Weights | 2 | 4 | 0 | **5** | 0 | **x** | 1 | 4 | 5 | 5 | 3 | 0 | **x** | 0 |

| | Node Locations | | | | |
|---|---|---|---|---|---|
| Link Failure | A | B | C | D | E |
| A → B | 1 | 0 | 0 | 1 | 1 |
| B → A | 0 | 1 | 1 | 1 | 0 |
| B → C | 1 | 1 | 0 | 0 | 1 |
| C → B | 0 | 0 | 1 | 1 | 1 |
| Coverages | 2 | 2 | 2 | 3 | 3 |
| Minimal Distances of 1 hop | 1 | 1 | 0 | X | 1 |
| Minimal Distances of 2 hops | 1 | 1 | 0 | X | 0 |
| Minimal Distances of 3 hops | 0 | 0 | 0 | X | 0 |

820

| Node ID | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Coverage Weights | 25 | 24 | 24 | 22 | 23 | 24 | 26 | 22 | 26 | 25 | 26 | 25 | 28 | 27 |

| Node ID | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Coverage Weights | 6 | 7 | 8 | 10 | 9 | 12 | 7 | 7 | 10 | 6 | 9 | 3 | 0 | 11 |

| Node ID | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Coverage Weights | 1 | 1 | 0 | 2 | 0 | 0 | 1 | 2 | 1 | 2 | 2 | 0 | 0 | 0 |

| Node ID | 3 | 7 | 9 | 10 |
|---|---|---|---|---|
| 5 | 2 | 3 | 2 | 3 |
| 12 | 2 | 2 | 1 | 1 |
| Sum of distances | 4 | 5 | 3 | 4 |

| | Node Locations | | | | |
|---|---|---|---|---|---|
| Link Failure | A | B | C | D | E |
| A → B | 1 | 0 | 0 | 1 | 1 |
| B → A | 0 | 1 | 1 | 1 | 0 |
| B → C | 1 | 1 | 0 | 0 | 1 |
| C → B | 0 | 0 | 1 | 1 | 1 |
| Coverages | 2 | 2 | 2 | 3 | 3 |
| Average Distanace | X | X | X | 1.67 | 1.67 |
| Average Distance | 1 | 0 | X | X | 2 |

CAPACITY-AWARE HEURISTIC APPROACH FOR PLACING SOFTWARE-DEFINED NETWORKING (SDN) SWITCHES IN HYBRID SDN NETWORKS FOR SINGLE LINK/NODE FAILURE

CROSS-REFERENCE TO RELATED APPLICATIONS

The present application claims priority to U.S. Provisional Patent Application 62/109,495, filed Jan. 29, 2015 by Min Luo, et al., and entitled "CAPACITY-AWARE HEURISTIC APPROACH FOR PLACING SDN SWITCHES IN HYBRID SDN NETWORKS TO ACHIEVE 100% SINGLE LINK/NODE FAILURE," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a networking paradigm that decouples network control and forwarding functions. The decoupling of the control plane from the data plane allows for centralization of network control, enabling effective policy administration and flexible management. The centralization of network control facilitates various network functionalities, such as network measurements, traffic engineering, enhanced quality of services, and enhanced access control. With the growing availability of SDN-enabled nodes and protocols, such as OpenFlow, many organizations have started deploying SDN networks.

SUMMARY

In one embodiment, the disclosure includes a network controller comprising a processor configured to obtain topology information of a network, wherein the topology information indicates a plurality of non-software-defined networking (non-SDN) network elements (NEs) interconnected by a plurality of links in the network, analyze each non-SDN NE according to the topology information to determine whether the non-SDN NE is a candidate NE for establishing a backup tunnel to protect a single-link failure at one of the plurality of links, and select a plurality of target NEs from the candidate NEs to protect against all single link-failures in the network, and a transmitter coupled to the processor and configured to send a first message to a first of the target NEs to dynamically enable SDN functionalities at the first target NE in order to facilitate single-link failure protection in the network. In some embodiments, the processor is further configured to analyze each non-SDN NE by obtaining routing information indicating a source NE of the plurality of non-SDN NEs reaches a plurality of destination NEs of the plurality of non-SDN NEs via a same next-hop link of the plurality of the links, and determining that a non-SDN NE is a candidate NE for establishing a backup tunnel with the source NE to protect the next-hop link when computing a first shortest path from the source NE to the non-SDN NE that excludes the next-hop link and computing a second shortest path from the non-SDN NE to each destination NE that excludes the next-hop link, and/or select the target NEs by determining a coverage weight value for each candidate NE according to a number of single-link failures protected by the candidate NE, and/or select the target NEs by determining a first threshold based on the coverage weight values, and selecting a first candidate NE corresponding to a first of the coverage weight values that satisfies the first threshold as the first target NE, and/or select the target NEs by re-computing a coverage weight value for remaining candidate NEs by excluding single-link failures protected by the first target NE, determining a second threshold based on the recomputed coverage weight values, determining that a second of the candidate NEs and a third of the candidate NEs comprise a same recomputed coverage weight value that satisfies the second threshold, and selecting the second candidate NE as a second of the target NEs when the second candidate NE comprises a greater number of hops from the first target NE than the third candidate NE, and/or select the target NEs by determining a threshold based on the coverage weight values, determining that a first of the candidate NEs and a second of the candidate NEs comprise a same coverage weight value that satisfies the threshold, determining a first distance weight value for the first candidate NE by computing a first average number of hops along first shortest paths corresponding to the first candidate NE, determining a second distance weight value for the second candidate NE by computing a second average number of hops along first shortest paths corresponding to the second candidate, and selecting the first candidate NE as the first target NE when the first distance weight value is less than the second weight value, and/or the transmitter is further configured to send a second message to the first target NE instructing the first target NE to establish a backup tunnel with a corresponding source NE according to a corresponding first shortest path for rerouting traffic around a corresponding next-hop link when a single-link failure occurs at the corresponding next-hop link, and/or generate a flow table according to a first shortest path and one of the second shortest paths corresponding to the first target NE, and wherein the transmitter is further configured to send a second message to the first target NE indicating the flow table, and/or the plurality of non-SDN NEs are Internet protocol (IP) routers.

In another embodiment, the disclosure includes a method implemented by a network controller, comprising obtaining topology information of a network, wherein the topology information indicates a plurality of non-SDN NEs interconnected by a plurality of links in the network, analyzing, via a processor of the NE, each non-SDN NE according to the topology information to determine whether a location of the non-SDN NE is a candidate location for placing an SDN-enabled NE to cover a single-link failure at one of the plurality of links, selecting, via the processor, a plurality of target locations from the candidate locations for placing SDN-enabled NEs to cover all single link-failures in the network, and sending, via a transmitter of the NE, a message to an administrative entity of the network identifying the target locations for placing SDN-enabled NEs in the network. In some embodiments, the disclosure also includes analyzing each non-SDN NE by obtaining routing information indicating a source NE of the plurality of non-SDN NEs reaches a plurality of destination NEs of the plurality of non-SDN NEs via a same next-hop link of the plurality of the links, and computing, via the processor, backup paths for rerouting traffic around the next-hop link according to the topology information, and determining, via the processor, that the location of the non-SDN NE is a candidate location when a first of the backup paths from the source NE to the non-SDN NE excludes the next-hop link and a second plurality of the backup paths from the non-SDN NE to the destinations NEs exclude the next-hop link, and/or selecting the target locations by constructing, via the processor, a table by generating a row to represent each single-link failure in the network and generating a column to represent each non-SDN NE location, filling, via the processor, a cell in the table with a value of one when a corresponding non-SDN NE location is a candidate location for placing an SDN-enabled NE to protect a corresponding single-link failure, filling, via the processor, a cell in the table with a value of a zero when a corresponding non-SDN NE location is not a candidate location for placing an SDN-enabled NE to protect a corresponding single-link failure, computing, via the processor, a coverage weight value for each column by adding values of cells in the column, determining, via the processor, a threshold based on the coverage weight values, and selecting, via the processor, a first of the non-SDN NE locations corresponding to a first of the columns comprising a first of the coverage weight values that satisfies the threshold as a first of the target locations, and/or selecting the target locations further by eliminating, via the processor, a first of the rows from the table when a cell in the first column corresponding to the first row comprises a value of one, and repeating, via the processor, coverage weight value computation and target location selection until all rows are eliminated, and/or selecting the target locations further by determining that a first of the candidate locations and a second of the candidate locations cover a same number of single-link failures in the network, computing a first distance weight value for the first candidate location by computing a first average number of hops along first backup paths corresponding to a non-SDN NE located at the first candidate location, computing a second distance weight value for the second candidate location by computing a second average number of hops along first backup paths corresponding to a non-SDN NE located at the second candidate location, and selecting the first candidate location as the first target location when the first distance weight value is less than the second distance weight value, and/or selecting the target locations further by computing, via the processor, a number of single-link failures covered by each candidate location, determining, via the processor, a threshold based on the number of single-link failures covered by the candidate locations, selecting, via the processor, a first of the candidate locations covering a first number of single-link failures that satisfies the threshold as a first of the target locations, determining, via the processor, that a second of the candidate locations and a third of the candidate locations cover a same number of remaining single-link failures, and selecting, via the processor, the second candidate location as a second of the target locations when the second candidate location comprises a greater number of hops from the first target location than the third candidate location, and/or the plurality of non-SDN NEs comprise IP routers, Ethernet switches, or combinations thereof.

In yet another embodiment, the disclosure includes a computer program product for use by a network controller, wherein the computer program product comprises computer executable instructions stored on a non-transitory computer readable medium such that when executed by a processor cause the network controller to obtain topology information indicating a plurality of IP routers interconnected by a plurality of links in a network, obtain link capacities of the plurality of links, analyze each IP router according to the topology information to determine whether each IP router is a candidate router for upgrading to an SDN-enabled switch to protect against a single-link failure at one of the plurality of links, select a plurality of target routers from the plurality of candidate routers for upgrading to SDN-enabled switches for rerouting traffic around all single-link failures in the network according to the topology information and the link capacities, and upgrade the target routers to SDN-enabled switches by dynamically installing SDN-functionalities at the target routers. In some embodiments, the disclosure also includes determining that an IP router is a candidate router by obtaining routing information indicating a source router of the plurality of IP routers reaches a plurality of destination routers of the plurality of IP routers via a same next-hop link of the plurality of the links, computing a first shortest path from the source router to the IP router that excludes the next-hop link, computing a second shortest path from the IP router to an intermediate IP router of the plurality of IP routers that excludes the next-hop link, and computing a third shortest path from the intermediate IP router to a first of the destination router that excludes the next-hop link, and/or selecting the target routers by determining a link bandwidth of each first shortest path according to a link capacity among links along the first shortest path, constructing, via the processor, a table by generating a row to represent each single-link failure and generating a column to represent each IP router, tabulating, via the processor, the link bandwidths in the table according to IP routers and single-link failures corresponding to the first shortest paths, filling, via the processor, remaining cells in the table with values of zeros, computing, via the processor, a coverage weight value for each column by determining a number of cells in the column with non-zero values, and computing, via the processor, a link capacity weight value for each column by adding values of cells in the column, and/or selecting the target routers further by determining, via the processor, that a first of the columns and a second of the columns comprise a same coverage weight value, and selecting an IP router corresponding to the first column as a first of the target routers when the first column comprises a greater link capacity weight value than the second column.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4A is a schematic diagram of another embodiment of a network topology.

FIG. 4B is a table illustrating an embodiment of single-link failure coverages in a network topology.

FIG. 4C illustrates an embodiment of an SDN-enabled node location selection scenario for a network topology.

FIG. 4D illustrates another embodiment of an SDN-enabled node location selection scenario.

FIG. 6B is a table illustrating an embodiment of a first selection according to a link-capacity-aware SDN-enabled node placement scheme.

FIG. 6C is a table illustrating an embodiment of a second selection according to a link-capacity-aware SDN-enabled node placement scheme.

FIG. 6D is a table illustrating an embodiment of a final selection according to a link-capacity-aware SDN-enabled node placement scheme.

FIG. 8B is a table illustrating a first selection according to a first extended SDN-enabled node placement scheme.

FIG. 8C is a table illustrating a second selection according to a second extended SDN-enabled node placement scheme.

FIG. 8D is a table illustrating a third selection according to a first extended SDN-enabled node placement scheme.

FIG. 8E is a table illustrating an embodiment of distances between SDN-enabled node candidate locations according to a first extended SDN-enabled node placement scheme.

DETAILED DESCRIPTION

Figure 1:
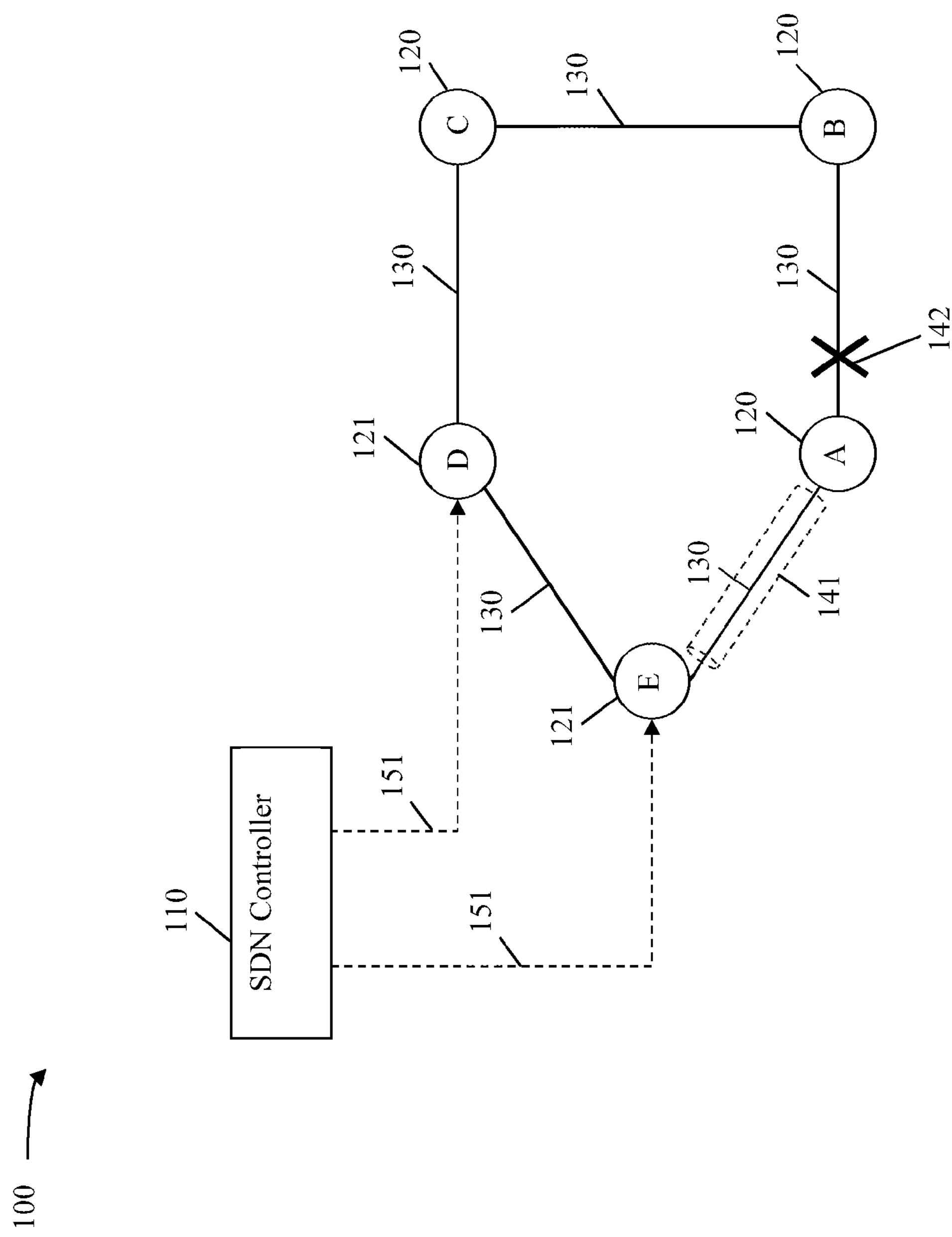
FIG. 1 is a schematic diagram of an embodiment of a hybrid SDN network.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Although SDN provides various benefits, such as service provisioning speed and agility and network flexibility and management, the deployment of SDN networks is a slow gradual process due to the cost and man power associated with replacing and/or upgrading original network switches into SDN-enabled nodes. In addition, upgrading all network switches in a network into SDN-enabled nodes at the same time may not be feasible or practical. As such, original network switches, such as IP routers and Ethernet switches, and SDN-enabled nodes may coexist in a network for a period of time during the upgrade. Therefore, cooperation and coordination between the network switches and the SDN-enabled nodes may support the deployment and design of hybrid SDN networks as described in U.S. patent application Ser. No. 14/071,329 to Min Luo, et al., which is incorporated herein by reference. Hybrid SDN networks may improve network performance and manageability. SDN hybrid networks may also be beneficial to network resiliency.

Network resiliency is the ability to provide and maintain an acceptable level of service upon network faults. The objective of network resilience design is to ensure that packets are forwarded with minimal interruption upon faults at links and/or nodes. Some of the design goals may include coverage of failure scenarios, such as all possible single-link failures, short disruption, and post-recovery load balancing. One approach to providing network resiliency is to employ backup paths or redundant links. For example, in multiprotocol label switching (MPLS), a working label-switched path (LSP) and a backup LSP are established at the same time. Under normal operation, traffic is directed along the working LSP. Upon a failure at the working LSP, traffic is redirected from the working LSP to the backup LSP. However, the employment of backup LSPs is resource inefficient since the number of backup LSPs may be large and bandwidths are reserved in advance for the backup LSPs. Other recovery schemes may include IP re-convergence and IP fast reroute (IPFRR). In the IP re-convergence scheme, when a network fault occurs, all IP routers re-compute routing tables according to the new topology excluding the failed node and/or the failed link. However, the re-computing of the routing tables causes slow convergence. In the IPFRR scheme, IP tunnels are pre-configured. Upon a network fault, traffic is redirected to the pre-configured IP tunnels bypassing the network fault. However, the IPFRR scheme does not consider post-recovery congestion and load balancing.

Disclosed herein are various embodiments for placing a minimum number of SDN-enabled switches in a hybrid SDN network to achieve 100 percent (%) single-link failure coverage. For example, a hybrid SDN network comprises a plurality of SDN-enabled NEs and a plurality of non-SDN NEs interconnected by a plurality of links. Each SDN-NE is designated to forward traffic for a subset of the non-SDN NEs upon a single-link failure at the subset of the non-SDN NEs. For example, a backup IP tunnel is established between a non-SDN NE and a corresponding designated SDN-enabled NE. Under normal operation, the non-SDN NE forwards traffic on some pre-determined routes. Upon detection of a single-link failure at a link connected to the non-SDN NE, the non-SDN NE forwards traffic affected by the single-link failure to the corresponding designated SDN-enabled NE. After the single-link failure is recovered, the non-SDN NE resumes routing on the pre-determined routes. The disclosed embodiments employ a heuristic approach to iteratively select node locations for installing SDN-enabled nodes. For example, the placement may be determined by a network controller of the network. In an embodiment, the node locations are selected by maximizing single-link failure coverages. In another embodiment, the node locations are further selected by maximizing link capacities of the backup IP tunnels, maximizing distances between the SDN-enabled NEs, or minimizing average distances between non-SDN NEs and corresponding designated SDN-enabled NEs. After selecting the locations for placing SDN-enabled NEs, the network controller may automatically upgrade the non-SDN NEs at the selected locations to SDN-enabled NEs. Alternatively, the network controller may send the list of target locations to an administrative entity of the network, where the non-SDN NEs at the selected location may be switched to SDN-enabled NEs. The disclosed embodiments allows for fast computation of SDN-enabled NE placements, thus is suitable for applying large scale networks. The disclosed embodiments may be extended to cover node failures.

Although the placement of SDN-enabled nodes for full single-link failure protection may be determined by employing a brute-force or exhaustive search algorithm as described in U.S. patent application Ser. No. 14/710,439 by Min Luo, et al., which is incorporated herein by reference, the disclosed heuristic approach is computationally less complex. For example, for a given network G(V, E), where V represents nodes in the network G and E represents links in the network G, the computational complexity for the brute-force approach is in an order of $O(2^{|V|})$, whereas the computational complexity for the heuristic approach is in an order of $O(|E|\times|V|^3)$. Therefore, the heuristic approach may be employed to dynamically determine optimal SDN-enabled node placements for network-wide single-link failure protection.

FIG. 1 is a schematic diagram of an embodiment of a hybrid SDN network 100. The network 100 comprises a combination of non-SDN nodes 120, shown as A, B, and C, and SDN-enabled nodes 121, shown as D and E. The non-SDN nodes 120 and the SDN-enabled nodes 121 are interconnected by a plurality of bi-directional links 130. The network 100 may be a packet-switched network, such as an IP network. The underlying infrastructure of the network 100 may be any types of networks, such as an electrical network, an optical network, or combinations thereof. The links 130 may comprise physical links, such as fiber optic links, electrical links, wireless links, and/or logical links used to transport data in the network 100. The SDN-enabled nodes 121 form a partial SDN network within the network 100. The network 100 employs an SDN controller 110 to control and manage the partial SDN network.

The non-SDN nodes 120 may include software programmable network devices and hardware switches configured to perform both control plane and data plane functions in the network 100. For example, the non-SDN nodes 120 may be IP routers and Ethernet switches. The non-SDN nodes 120 may comprise one or more interfaces. For example, the non-SDN node A 120 comprises one interface coupled to the SDN-enabled node E 121 and another interface coupled to the non-SDN node B 120. In the control plane, the non-SDN nodes 120 compute and select optimal paths in the network 100. For example, the non-SDN node A 120 may select the non-SDN node B 120 or the SDN-enabled node E 121 as a next-hop node. In the data plane, the non-SDN nodes 120 forward packets according to the selected optimal paths.

The SDN-enabled nodes 121 are software programmable network devices configured to implement functionalities of an SDN data plane. The SDN-enabled nodes 121 forward packets according to forwarding instructions received from the network controller 110 as shown by the arrows 151. The SDN-enabled nodes 121 are further configured to interact with the non-SDN nodes 120. In an embodiment, the non-SDN nodes 120 may employ a routing protocol, such as an open shortest path first (OSPF) protocol or an intermediate system to intermediate system (IS-IS) protocol, to route packets in the network 100. Thus, the SDN-enabled node 121 may implement and support at least a portion of the same routing protocol in order to communicate with the non-SDN nodes 120 for forwarding packets in the network 100. The SDN-enabled nodes 121 are also referred to as SDN-enabled switches.

The network controller 110 may be a virtual machine (VM), a hypervisor, or any other device configured to manage and control at least a portion of the network 100. The network controller 110 generates and/or obtains a full topology view of the network 100. In an embodiment, the network controller 110 may obtain topology information from a topology database. The network controller 110 computes forwarding paths through the network 100 according to the topology information. For example, the network controller 110 may employ a shortest path algorithm to determine a best path between a source-destination pair in the network 100. The network controller 110 directly controls SDN-enabled nodes 121 in the network 100. For example, after computing the forwarding paths, the network controller 110 sends forwarding instructions to the SDN-enabled nodes 121 to instruct the SDN-enabled nodes 121 to forward packets according to the computed forwarding paths. For example, the forwarding instructions may include a next-hop node, which may be an SDN-enabled node 121 or a non-SDN node 120. In an embodiment, the network controller 110 and the SDN-enabled nodes 121 communicate via an OpenFlow protocol. The SDN-enabled nodes 121 may store the forwarding instructions in flow tables.

In an embodiment, a backup IP tunnel is established between each interface of the non-SDN nodes 120 and an SDN-enabled node 121. The backup IP tunnel is employed as a backup path to provide failover upon detecting a link failure on a corresponding interface. As an example, a backup IP tunnel 141 is established between the non-SDN node A 120 and the SDN E 121 to protect a link failure at the link 130 between the non-SDN nodes A and B 120. Prior to a link failure, the non-SDN node A 120 may employ a forwarding table as shown below:

TABLE 1

| Forwarding Table of the non-SDN node A 120 Prior to a Link Failure | |
|---|---|
| Destination Node | Next-hop Node |
| B | B |
| C | B |
| D | E |
| E | E |

Upon detecting a failure on the link 130 between the non-SDN nodes A and B 120 as shown by the cross 142, the non-SDN node A 120 encapsulates and forwards all the packets that are originally routed through the failed link 130 to the SDN-enabled node E 121 via the pre-established backup IP tunnel 141. The non-SDN node A 120 may employ a forwarding table as shown below:

TABLE 2

| Forwarding Table of the non-SDN node A 120 After a Link Failure | |
|---|---|
| Destination Node | Next-hop Node |
| B | E |
| C | E |
| D | E |
| E | E |

Upon receiving tunneled traffic from the non-SDN node A 120, the SDN-enabled node E 121 decapsulates the received packets and performs flow table lookup. The SDN-enabled node E 121 may select next-hop nodes from the flow table so that the received packets may be forwarded to corresponding destinations without traversing the failed link 130 between the non-SDN nodes A and B 120.

After the link failure recovers, the non-SDN node A 120 stops encapsulating and forwarding packets to the SDN-enabled node E 121 via the backup tunnel 141. The non-SDN node A 120 returns to employ the original forwarding table as shown in table 1.

In an embodiment, the network 100 may originally be deployed as an IP network with IP routers corresponding to the non-SDN nodes 120. The network controller 110 may determine to place one or more SDN-enabled nodes 121 in the network 100 to provide network resiliency by employing backup IP tunnels such as the backup IP tunnels 141 as described above. The network controller 110 may select a minimum subset of the original IP routers for SDN conversion to achieve full single-link failure coverage, as described more fully below.

Figure 2:
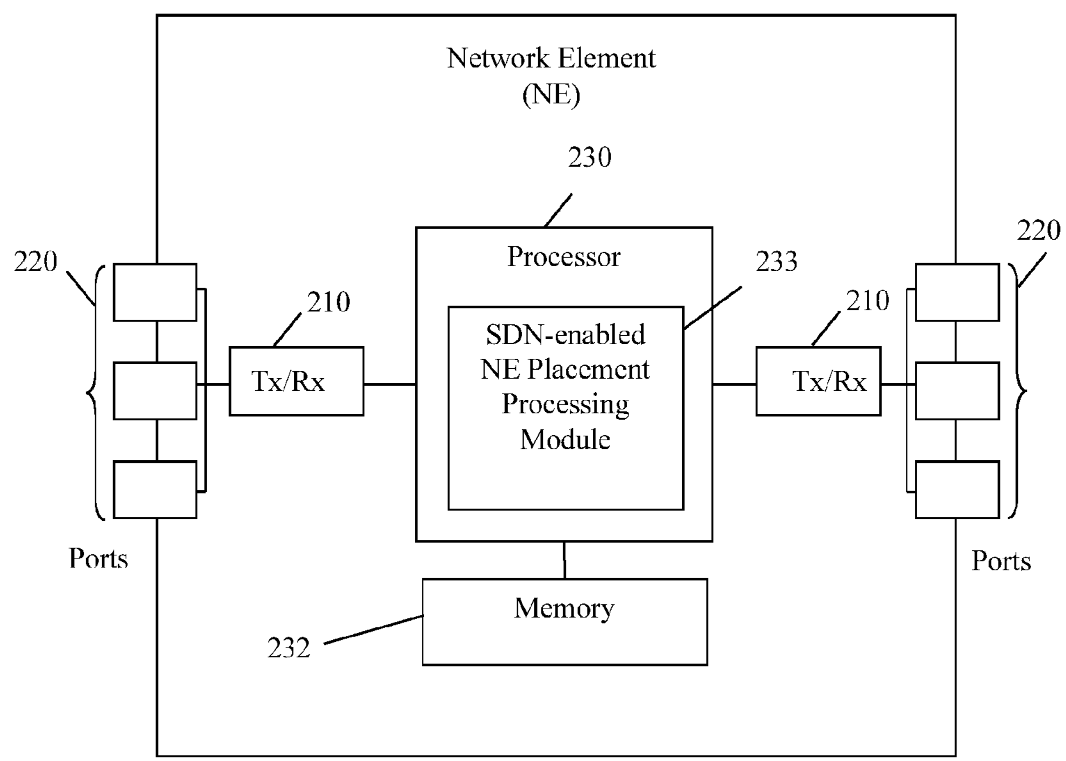
FIG. 2 is a schematic diagram of an embodiment of an NE.

FIG. 2 is a schematic diagram of an embodiment of an NE 200, such as the network controller 110, the non-SDN nodes 120, and the SDN-nodes 121 nodes 120 in the network 100. NE 200 may be configured to implement and/or support the SDN-enabled NE placement and single-link failure protection mechanisms and schemes described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 200. For instance, the features/methods in the disclosure may be implemented using hardware, firmware, and/or software installed to run on hardware. The NE 200 is any device that transports packets through a network, e.g., a switch, router, bridge, server, a client, etc. As shown in FIG. 2, the NE 200 comprises transceivers (Tx/Rx) 210, which may be transmitters, receivers, or combinations thereof. The Tx/Rx 210 is coupled to a plurality of ports 220 for transmitting and/or receiving frames from other nodes.

A processor 230 is coupled to each Tx/Rx 210 to process the frames and/or determine which nodes to send the frames to. The processor 230 may comprise one or more multi-core processors and/or memory devices 232, which may function as data stores, buffers, etc. The processor 230 may be implemented as a general processor or may be part of one or more application specific integrated circuits (ASICs) and/or digital signal processors (DSPs). The processor 230 may comprise an SDN-enabled placement processing module 233, which may perform SDN switch placement for single-failure coverage and may implement methods 1100 and 1200, as discussed more fully below, and/or any other flowcharts, schemes, and methods discussed herein. As such, the inclusion of the SDN-enabled placement processing module 233 and associated methods and systems provide improvements to the functionality of the NE 200. Further, the SDN-enabled placement processing module 233 effects a transformation of a particular article (e.g., the network) to a different state. In an alternative embodiment, SDN-enabled placement processing module 233 may be implemented as instructions stored in the memory devices 232, which may be executed by the processor 230. The memory device 232 may comprise a cache for temporarily storing content, e.g., a random-access memory (RAM). Additionally, the memory device 232 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 232 may be configured to store one or more routing tables.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3A:
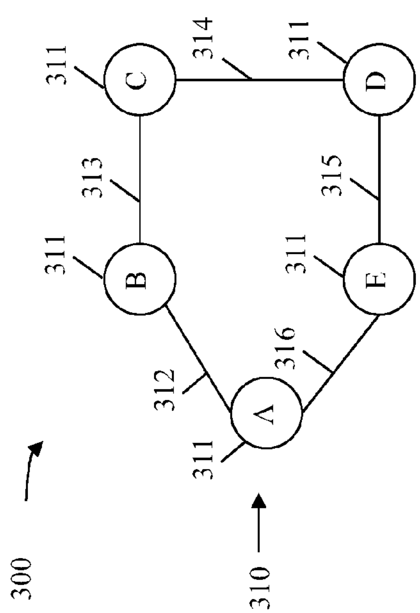
FIG. 3A is a schematic diagram of an embodiment of a network topology.

FIGS. 3A-3D illustrate a scheme 300 for placing a minimum number of SDN-enabled nodes, such as the SDN-enabled nodes 121, in a network, such as the network 100, to provide full single-link failure coverage in the network. The scheme 300 is implemented by a network controller such as the network controller 110. The scheme 300 is implemented to enable the employment of backup tunnels for single-link failure protection as described in the network 100. The scheme 300 employs a heuristic approach to determine the placements according to a given topology of the network. The scheme 300 begins with constructing a table to determine candidate locations for placing SDN-enabled nodes to cover each link failure according to a topology of the network. Subsequently, the placement is determined by selecting a minimum number of locations to cover all single-link failures in the network. FIG. 3A is a schematic diagram of an embodiment of the network topology 310. The network topology 310 is similar to the topology of the network 100. The network topology 310 is formed from a plurality of nodes 311 similar to the non-SDN nodes 120 interconnected by a plurality of links 312, 313, 314, 315, and 316 similar to the links 130.

Figure 3B:
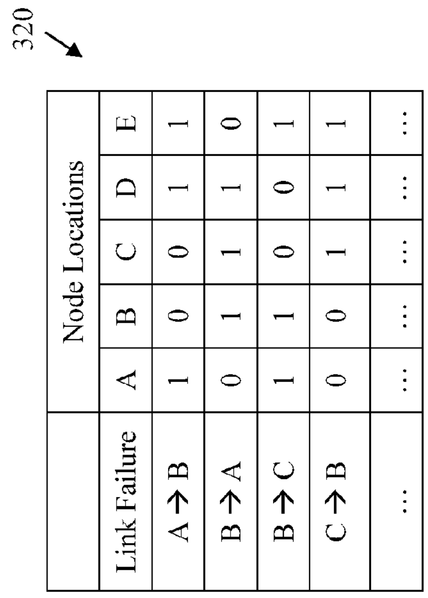
FIG. 3B is a table illustrating an embodiment of candidate locations for placing SDN-enabled nodes in a network topology.

FIG. 3B is a table 320 illustrating an embodiment of candidate locations for placing SDN-enabled nodes in the network topology 310. The table 320 is constructed by considering each single-link failure at a link, denoted as $L_{ij}$, from a node i to a node j and analyzing each node k to determine whether the location of the node k is a candidate location for placing an SDN-enabled node to cover the failed link $L_{ij}$. The nodes i, j, and k are in the set of nodes A-E 311. The location of a node k is a candidate location when the following two conditions are met: first, there is a shortest path from the node i to the node k that excludes the failed link $L_{ij}$; second, there is a shortest path from the node k to an intermediate node m and a shortest path from the intermediate node m to each destination node d affected by the failed link $L_{ij}$ that exclude the failed link $L_{ij}$. The nodes m and k are in the set of nodes A-E 311.

In the table 320, each row corresponds to a single-link failure at a link $L_{ij}$ and each column corresponds to a node k in the network topology 300. The table 320 shows whether the location of each node k is a candidate location for covering a failed link $L_{ij}$. A candidate location is represented by a value of 1, otherwise a value of 0. As an example, the node A 311 may employ a shortest-path forwarding table as shown below:

TABLE 3

Forwarding Table for node A 311

| Destination Node | Next-hop Node |
|---|---|
| B | B |
| C | B |
| D | E |
| E | E |

When the link 312 from the node A 311 and the node B 311 fails, the node A 311 may not reach the nodes B and C 311 when employing the forwarding table shown in table 3. Thus, the location of the nodes B and C 311 are not candidate locations since the outer headers of the packets may still comprise the addresses of the node B 311 or the node C 311. On the other hand, the locations of the nodes A, D, and E 311 are candidate locations. For example, the node A 311 may reach the node E 311 via a shortest path that excludes the failed link 312 and the node E 311 may reach the affected node B 311 via a shortest path traversing through the nodes C and D 311 without including the failed link 312. The node E 311 may also reach the affected node C 311 via a shortest path traversing through the node D 311 without including the failed link 312.

Figure 3C:
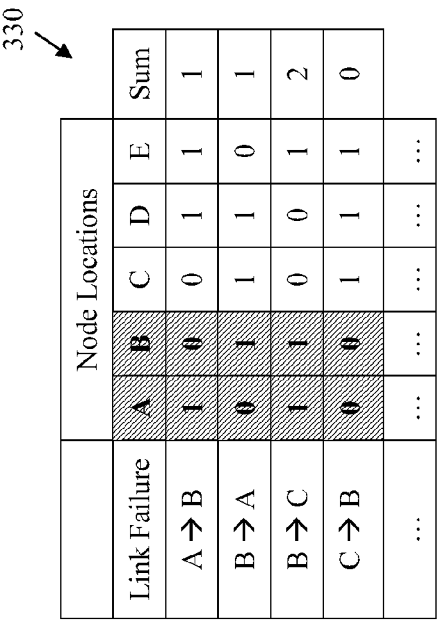
FIG. 3C is a table illustrating an embodiment of a single-link failure coverage scenario.

FIG. 3C illustrates an embodiment of a single-link failure coverage scenario 330. The scenario 330 corresponds to selecting the locations of the nodes A and B 311 as target locations for placing SDN-enabled nodes, where corresponding columns are shown as shaded columns. To determine whether placing SDN-enabled nodes at the locations of the nodes A and B 311 may provide a full coverage for all single-link failures, a sum is generated for each row by adding the values in the shaded columns. Full coverage is achieved when the sum of each row comprises a value greater than or equal to one. As shown, the sum corresponding to a link failure at the link 313 from the node C 311 to the node B 311 comprise a value of zero, indicating that placing SDN-enabled nodes at the locations of the nodes A and B 311 does not cover the link failure.

Figure 3D:
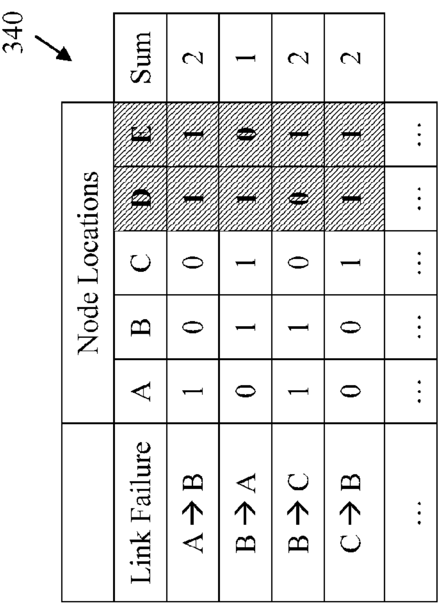
FIG. 3D is a table illustrating another embodiment of a single-link failure coverage scenario.

FIG. 3D illustrates another embodiment of a single-link failure coverage scenario 340. The scenario 340 corresponds to selecting the locations of the nodes D and E 311 as target locations for placing SDN-enabled nodes, where corresponding columns are shown as shaded columns. Similar to the scenario 330, a sum is computed for each row according to the shaded columns. As shown, all of the sums are greater than or equal to one. Thus, placing SDN-enabled nodes at the locations of the nodes D and E 311 achieves full single-link coverage in the network.

FIGS. 4A-4D illustrate a basic SDN-enabled node placement scheme 400. The scheme 400 is implemented by a network controller such as the network controller 110. The scheme 400 is implemented to enable the employment of backup tunnels for single-link failure protection as described in the network 100. The objective of the scheme 400 is to place a minimum number of SDN-enabled nodes, such as the SDN-enabled nodes 121, in a network, such as the network 100, to provide full single-link failure coverage in the network. The scheme 400 is similar to the scheme 300, and employs a greedy approach for column selection. In the greedy approach, candidate locations are selected iteratively until all link failures are covered. FIG. 4A is a schematic diagram of another embodiment of a network topology 410. The scheme 400 is applied to the network topology 410. The network topology 410 is similar to the network topology 310. The network topology 410 comprises a plurality of nodes 411 similar to the nodes 120, 121, and 311 communicatively coupled by a plurality of links 412 similar to the links 130 and 312-316.

FIG. 4B is a table 420 illustrating an embodiment of single-link failure coverages in the network topology 410. The candidate locations are determined by employing the same mechanisms as the table 320. The coverage weight for an SDN candidate location is computed by summing values in a corresponding column as shown in the row 421. It should be noted that the table 420 only considers the links 411 between the nodes A, B, and C, but the same process may be applied to include any number of nodes and links. Alternatively, different tables such as the table 420 may be constructed for different subset of nodes in a network.

FIG. 4C illustrates an embodiment of an SDN-enabled node location selection scenario 430. In the scenario 430, column selection is applied to the table 420. As shown, both the columns 431 and 432 comprise the same maximum coverage weight value of 3. Thus, the scheme 400 may arbitrarily select the column 431 or the column 432. For example, the scheme 400 determines to select the column 431 corresponding to the node D 311. Thus, the column 431 is selected and removed, shown as a shaded column. The rows 433, 434, and 435 comprise values of one in the column 431, indicating that the placement of an SDN-enabled node at the location of the node D 311 may cover the link failures corresponding to the rows 433-435. Thus, the rows 433-435 are also removed as shown by the lines 437.

FIG. 4D illustrates another embodiment of an SDN-enabled node location selection scenario 440. The scenario 440 is generated by repeating column selection after the scenario 430. As shown, the column 432 corresponding to the node E 311 is selected next. Thus, in addition to the column 431, the column 432 is selected and removed, where the columns 431 and 432 are shown as shaded columns. In addition to the rows 433-435, the row 436 is also removed as showed by the lines 437. As such, by placing SDN-enabled nodes at the locations of the nodes D and E 311, all single-link failures shown in the rows 433-436 are covered. Therefore, the network topology 410 requires a minimum of two SDN-enabled nodes to cover all possible single-link failures.

In an embodiment, the scheme 400 is applied to a network comprising 500 nodes and 2000 links. In the network, each node is connected to an average of about 8 links, the maximum pairwise distance is about 5 hops, and the average pairwise distance is about 3.212 hops. The scheme 400 shows that the network requires a minimum of 4 SDN-enabled nodes to protect each node with one SDN-enabled node and a minimum of 5 SDN-enabled nodes to protect each node with two SDN-enabled nodes. Thus, the scheme 400 efficiently places SDN-enabled nodes in large networks.

FIGS. 5A-5D illustrate a link capacity-aware SDN-enabled node placement scheme 500. The scheme 500 is implemented by a network controller such as the network controller 110. The scheme 500 is implemented to enable the employment of backup tunnels for single-link failure protection as described in the network 100. The scheme 500 is similar to the scheme 400, but considers both coverages and link capacities. The first objective of the scheme 500 is to place a least number of SDN-enabled nodes, such as the SDN-enabled nodes 121, in the network to provide full single-link failure coverage in the network. The second object of the scheme 500 is to maximize capacities of backup IP tunnels such as the tunnel 140 between affected nodes such as the nodes 120 and corresponding designated SDN-enabled nodes.

Figures 5A, 5B, 5C, 5D:
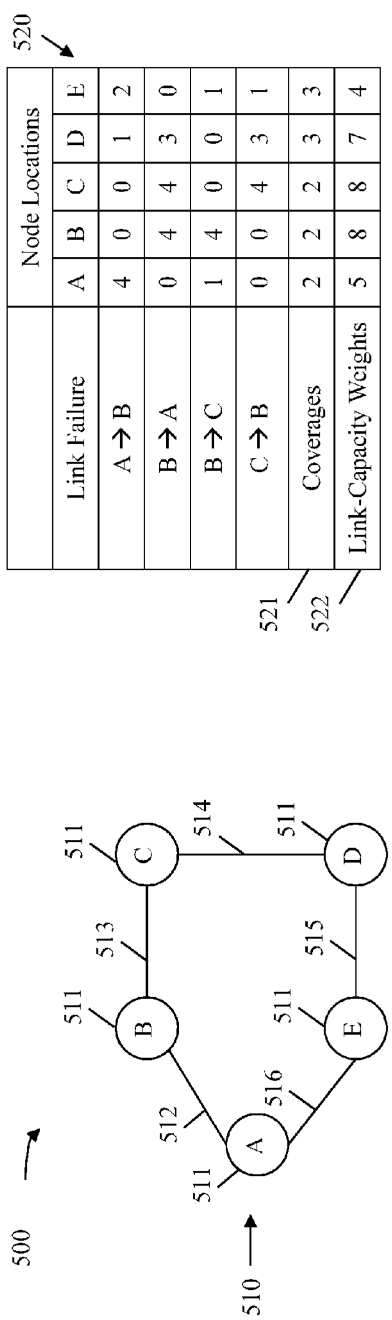
FIG. 5A is a schematic diagram of another embodiment of a network topology.
FIG. 5B is a table illustrating an embodiment of single-link failure coverages and link capacities in a network topology.
FIG. 5C illustrates another embodiment of an SDN-enabled node location selection scenario.
FIG. 5D illustrates another embodiment of an SDN-enabled node location selection scenario.

FIG. 5A is a schematic diagram of another embodiment of a network topology 510. The scheme 500 is applied to the network topology 510. The network topology 510 is similar to the network topologies 310 and 410, and further illustrates link capacities. The network topology 510 comprises a plurality of nodes 511 similar to the nodes 120, 121, 311, and 411 communicatively coupled by a plurality of links 512, 513, 514, 515, and 516 similar to the links 130, 312-316, and 412. The links 512, 513, 514, 515, and 516 comprises link capacities of 10 megabits per second (Mbps), 40 Mbps, 30 Mbps, 10 Mbps, and 20 Mbps, respectively.

FIG. 5B is a table 520 illustrating an embodiment of single-link failure coverages link-capacities in the network topology 510. In the scheme 500, the candidate locations are determined by employing the same mechanisms as in the schemes 300 and 400. However, the table 520 shows the candidate location in terms of link capacities. The table 520 is constructed by considering each single-link failure at a link, denoted as $L_{ij}$, from a node i to a node j and examining each node k to determine whether the location of the node k is an eligible candidate for placing an SDN switch to cover the failed link $L_{ij}$ and the bandwidth of the bottleneck link or the minimum link capacity between the node i and the node k. The nodes i, j, and k are in the set of nodes A-E 511. A candidate location is represented by the bottleneck bandwidth divided by 10, otherwise by a value of 0. As an example, to consider the location of the node D 511 for a link failure at the link 512 from the node A 511 to the node B 511, the shortest path from the node A 511 to the node D 511 may include the nodes A, E, and D 511 and the links 516 and 515. The bottleneck is at the link 515 with a minimum link capacity of 10 Mbps, and thus the candidate node D 511 comprising a value of 1, which is computed by dividing the minimum link capacity of 10 Mbps by 10. The coverages are computed by employing the same mechanisms as the table 420, shown in the row 521. The capacity weight for an SDN candidate location is computed by summing the values in a corresponding column as shown in the row 522.

FIG. 5C illustrates another embodiment of an SDN-enabled node location selection scenario 530. In the scenario 530, column selection is applied to the table 520. The selection is performed by first considering single-link failure coverages and followed by link capacities. As shown, the both the columns 531 and 532 comprise the same maximum coverage weight value of 3. Thus, the scheme 500 first considers node D 511 corresponding to column 531 and the node E 511 corresponding to the column 532 for the selection. Next, the scheme 500 selects the candidate comprising the maximum capacity weight value, which corresponds to the node D 511, shown as a shaded column. Similar to the scenario 430, the rows 533, 534, and 535 corresponding to the link failures covered by the node D 511 are removed as shown by the lines 537.

FIG. 5D illustrates another embodiment of an SDN-enabled node location selection scenario 540. The scenario 540 is generated by repeating the selection after the scenario 530. As shown, the coverage is recomputed after removing the rows 533-535. Similar to the scenario 530, the maximum coverage is considered first, followed by the maximum link-capacity weight. As shown, the scheme 500 selects the location of node B 511, where the column 538 corresponding to the node B 511's location is shaded in addition to the column 531 selected in the scenario 530. Similarly, the row 536 is removed in addition to the rows 533-535.

Figure 6A:
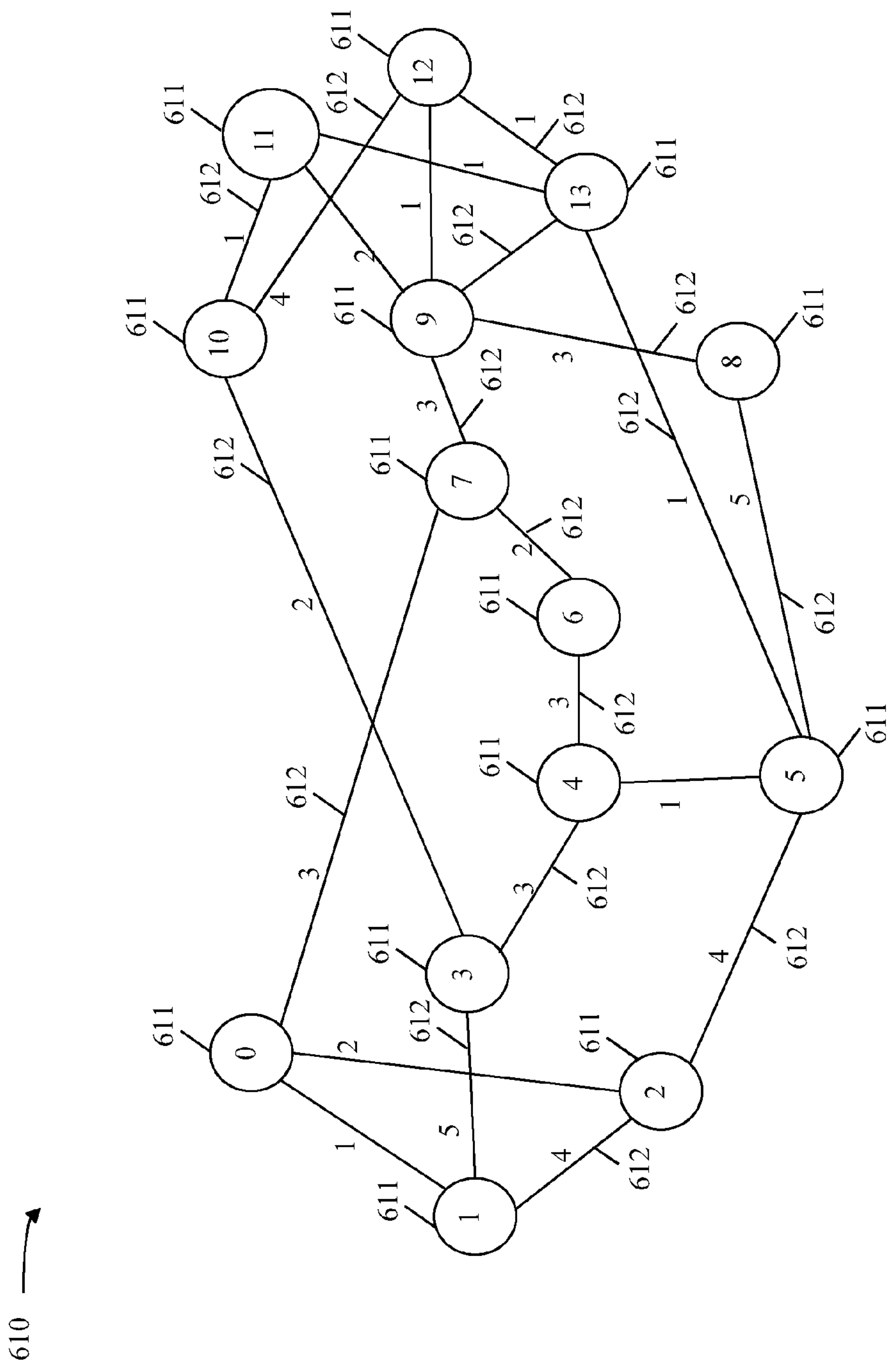
FIG. 6A illustrates an embodiment of a network topology for evaluating performance of a link-capacity-aware SDN placement scheme.
Figure 6E:
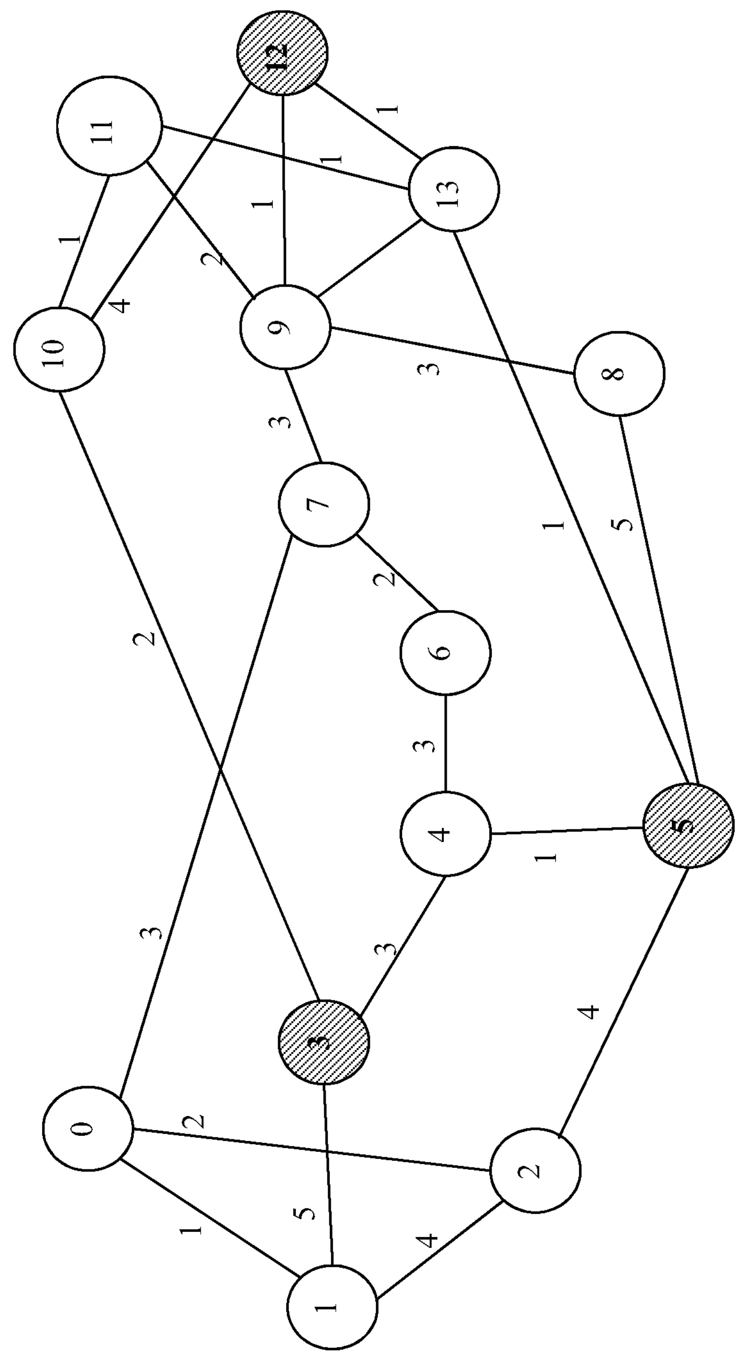
FIG. 6E illustrates an embodiment of SDN-enabled node placements in a network topology according to a link-capacity-aware SDN-enabled node placement scheme.

In an embodiment, the scheme 500 is applied to a network comprising 14 nodes. FIGS. 6A-6E illustrate the network configuration and selection results. FIG. 6A illustrates an embodiment of a network topology 610 for evaluating performance of the link-capacity-aware SDN placement scheme 500. The network topology 610 comprises a plurality of nodes 611, shown as 0-13, similar to the nodes 120, 121, 311, 411, and 511 communicatively coupled by a plurality of links 612 similar to the links 130, 312-316, 412, and 512-516, where corresponding link capacities are shown in units of 10 Mbps. The scheme 500 achieves full single-link failure coverage after three iterations of SDN candidate selections. FIG. 6B is a table 620 illustrating an embodiment of a first selection according to the link-capacity-aware SDN-enabled node placement scheme 500, where the location of the node 12 with a maximum coverage of 28 link failures and a link capacity weight of 52 is selected. FIG. 6C is a table 630 illustrating an embodiment of a second selection according to the link-capacity-aware SDN-enabled node placement scheme 500, where the location of the node 5 with a maximum coverage of 12 link failures and a link capacity weight of 25 is selected. FIG. 6D is a table 640 illustrating an embodiment of a final selection according to the link-capacity-aware SDN-enabled node placement scheme 500, where the location of node 5 with a maximum coverage of 2 link failures and a link capacity weight of 5 is selected. Thus, the network topology 610 requires a minimum of 3 SDN-enabled nodes at the locations of the nodes 3, 5, and 12 to provide a full coverage for all possible single-link failures. FIG. 6E illustrates an embodiment of SDN-enabled node placements in the network topology 610 according to a link-capacity-aware SDN-enabled node placement scheme 500, where the SDN-enabled nodes are shown as shaded circles.

Figures 7A, 7B:
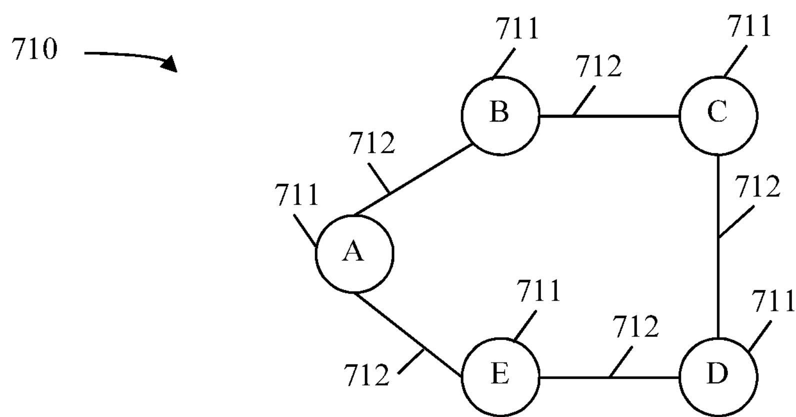
FIG. 7A is a schematic diagram of another embodiment of a network topology.
FIG. 7B is a table illustrating an embodiment of single-link failure coverages and distances between SDN-enabled node candidate locations in a network topology.

FIGS. 7A-7B illustrate a first extended SDN-enabled node placement scheme 700.

The scheme 700 is implemented by a network controller such as the network controller 110. The scheme 700 is implemented to enable the employment of backup tunnels for single-link failure protection as described in the network 100. The scheme 700 is similar to the scheme 400, but considers distances between SDN-enabled nodes in addition to single-link failure coverages. The first objective of the scheme 700 is to place a least number of SDN-enabled nodes in the network to provide full single-link failure coverage in the network. The second objective of the scheme 700 is to maximize distances or number of hops between SDN-enabled nodes to avoid shared links between SDN-enabled nodes and to reduce the risk of overloading shared links.

FIG. 7A is a schematic diagram of another embodiment of a network topology 710. The scheme 700 is applied to the network topology 710. The network topology 710 is similar to the network topologies 310, 410, and 510. The network topology 710 comprises a plurality of nodes 711 similar to the nodes 120, 311, 411, and 511 communicatively coupled by a plurality of links 712 similar to the links 130, 312-316, 412, and 512-516.

FIG. 7B is a table 720 illustrating an embodiment of single-link failure coverages and distances between SDN-enabled node candidate locations in the network topology 710. In the scheme 700, the candidate locations are determined by employing the same mechanisms as in the schemes 300 and 400. Similar to the tables 320 and 420, the table 720 represents candidate locations by values of 1, otherwise by values of 0. Similar to the schemes 400 and 500, after determining the candidate locations, the scheme 700 selects the candidate location with the maximum single-link failure coverage as a target location, shown as a shaded column, and removes the rows 721, 722, and 723 corresponding to the single-link failures covered by the node D 711 shown by the lines 724. Thus, a first SDN switch may be placed at the location of the node D 711. Next, the scheme 700 determines distances or the number of hops between the selected candidate location or target location and other SDN candidate locations. To determine the distances, the scheme 700 begins with a minimal distance of 1 hop and eliminates any candidate locations that are separated from the selected candidate location by a distance less than or equal to the minimal distance. As shown, the row 725 represents the nodes 711 that are separated from the node D 711 by at least a minimal distance of 1 by values of 1, otherwise values of 0. If there are more than one node remaining after the elimination, the scheme 700 increases the minimal distance by 1 hop and repeats the elimination process until only a single node location remains or no node location remains. As shown, the row 726 represents the nodes 711 that are separated from the node D 711 by at least a minimal distance of 2 by values of 1, otherwise values of 0. The row 727 represents the nodes 711 that are separated from the node D 711 by at least a minimal distance of 3 by values of 1, otherwise values of 0. If there is no remaining node after increasing the minimal distance, the scheme 700 may select any of the remaining nodes in a previous iteration. Thus, the scheme 700 may select the location of the node A 711 or the node B 711 for placing a second SDN switch as shown by the dashed circles.

Figure 8A:
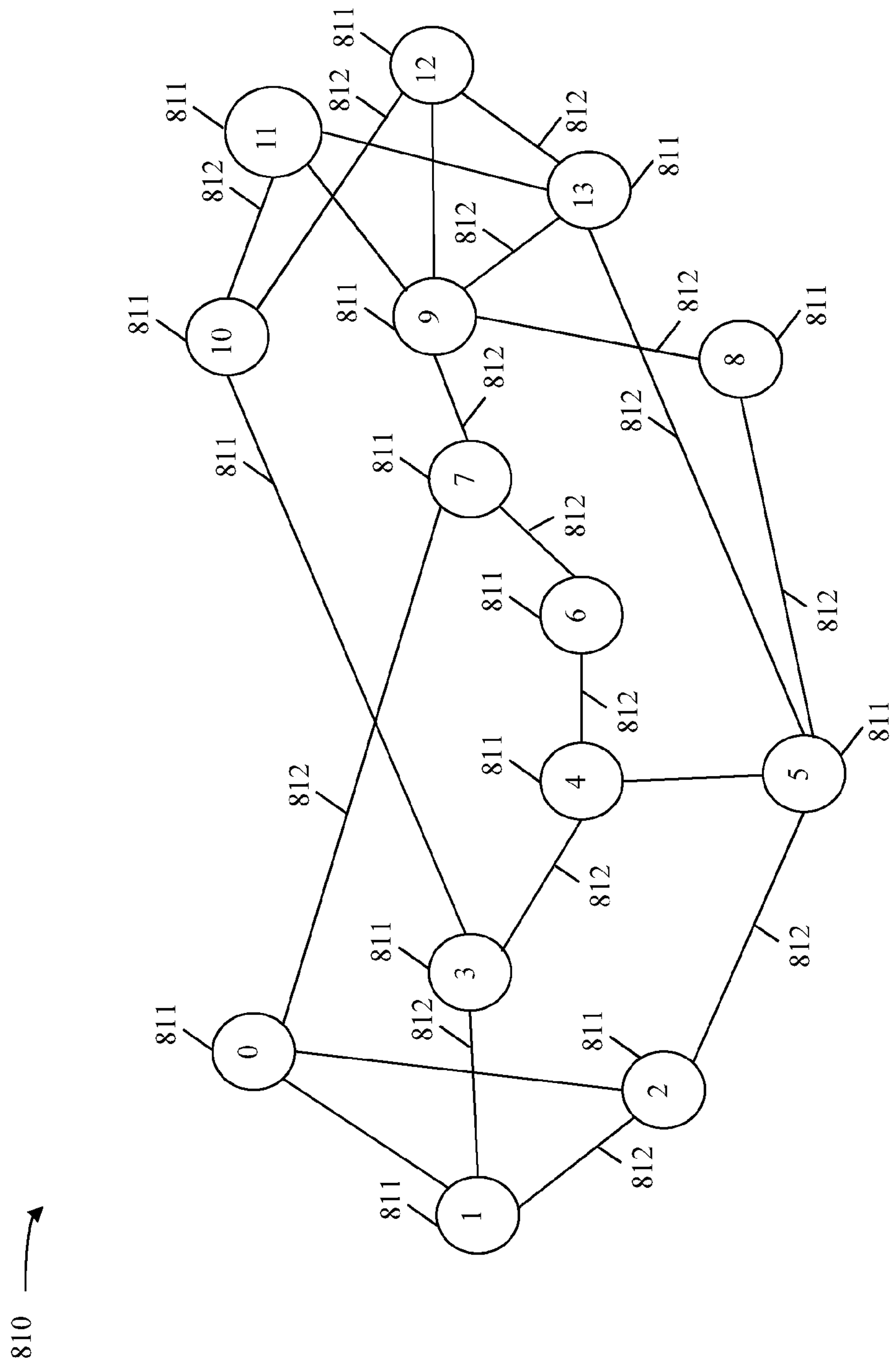
FIG. 8A illustrates an embodiment of a network topology for evaluating performance of a first extended SDN-enabled node placement scheme.

In an embodiment, the scheme 700 is applied to a network comprising 14 nodes. FIGS. 8A-8E illustrate the network configuration and selection results. FIG. 8A illustrates an embodiment of a network topology 810 similar to the network topology 710 for evaluating performance of the first extended SDN placement scheme 700. The network topology 810 comprises a plurality of nodes 811, shown as 0-13, similar to the nodes 120, 121, 311, 411, and 511 communicatively coupled by a plurality of links 812 similar to the links 130, 312-316, 412, and 512-516. The scheme 700 achieves full single-link failure coverage after three iterations of SDN candidate selections.

FIG. 8B is a table 820 illustrating a first selection according to the first extended SDN-enabled node placement scheme 700, where the location of the node 12 with a maximum coverage of 28 link failures is selected for placing a first SDN switch. FIG. 8C is a table 830 illustrating a second selection according to the first extended SDN-enabled node placement scheme 700, where the location of the node 5 with a maximum coverage of 12 link failures is selected for placing a second SDN switch. FIG. 8D is a table 840 illustrating a third selection according to the first extended SDN-enabled node placement scheme 700, where the locations of the nodes 3, 7, 9, and 10 cover the same number of single-link failures. As described above, the scheme 700 selects candidate locations by maximizing distances among SDN-enabled nodes.

Figure 8F:
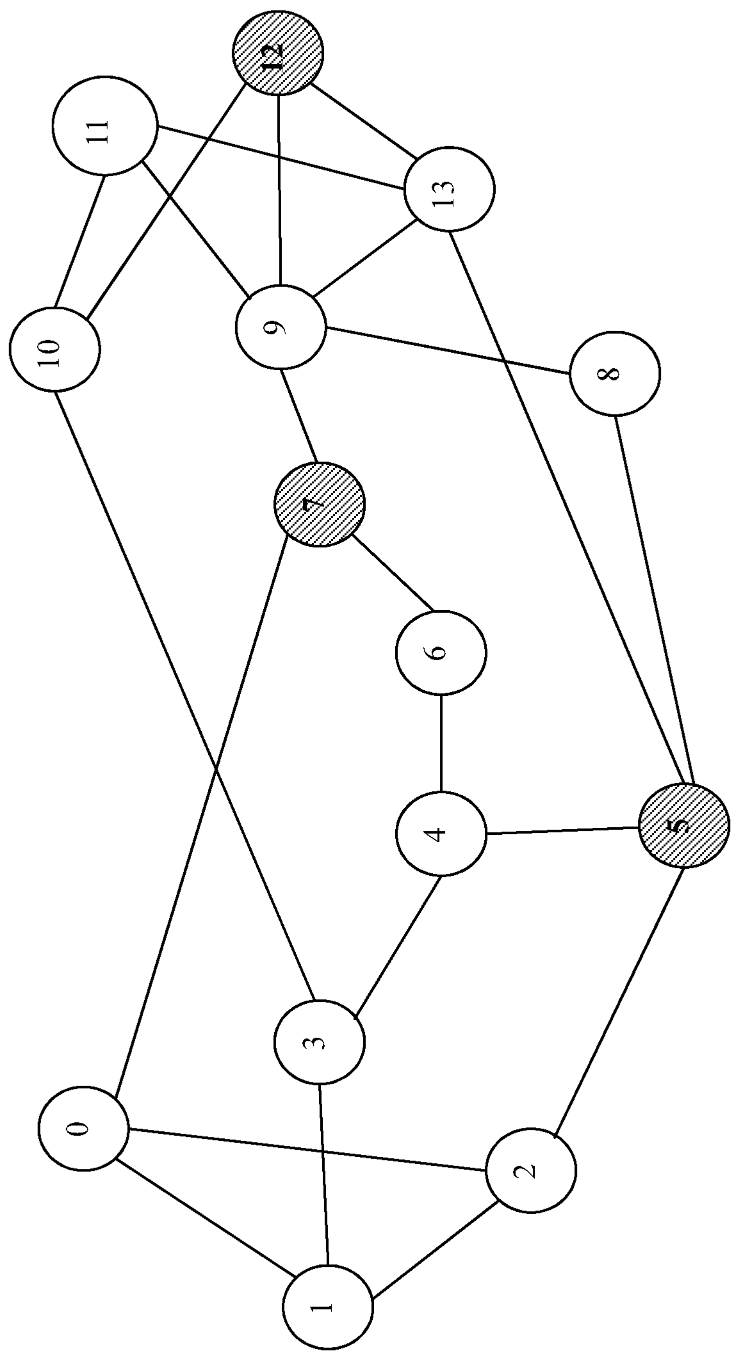
FIG. 8F illustrates an embodiment of SDN-enabled node placements in a network topology according to the a extended SDN-enabled node placement scheme.

FIG. 8E is a table 850 illustrating an embodiment of distances between the SDN-enabled node candidate locations according to the first extended SDN-enabled node placement scheme 700. The column 851 shows the SDN-enabled node locations selected from the first and second selections. The columns 852-855 show the distances between the candidate node locations at the nodes 3, 7, 9, and 10 and the selected SDN-enabled node locations. The row 856 is the sum of the total distances for each of the nodes 3, 7, 9, and 10. As shown in the rows 857 and 858, for a minimal distance of 1, all the nodes 3, 7, 9, and 10 pass the elimination; for a minimal distance of 2, the nodes 3 and 7 remains; and for a minimal distance of 3, all of the nodes 3, 7, 9, and 10 are eliminated. Thus, returning to the minimal distance of 2, a selection is made between the nodes 3 and 7. Comparing the sum of distances for the nodes 3 and 7, the node 7 comprises a greater sum of distances, indicating that the node 7 is further apart from the selected SDN locations. The third SDN switch is placed at the location of the node 7. FIG. 8F illustrates an embodiment of SDN-enabled node placements in the network topology 810 according to the first extended SDN-enabled node placement scheme 700, where the SDN-enabled nodes are shown as patterned filled circles.

Figure 9A:
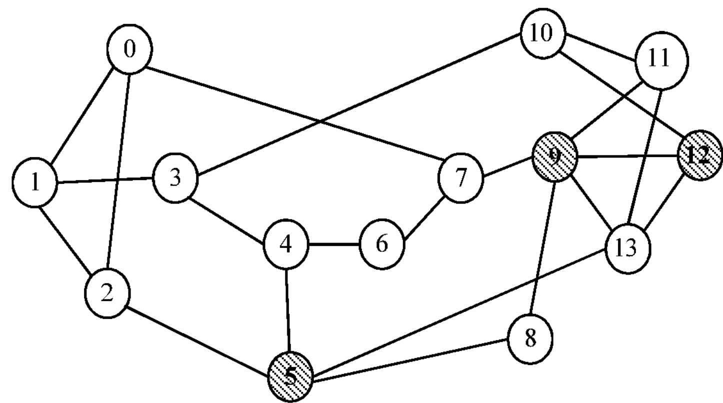
FIG. 9A illustrates an embodiment of SDN-enabled node placements in a network topology according to a basic SDN-enabled node placement scheme.
Figure 9B:
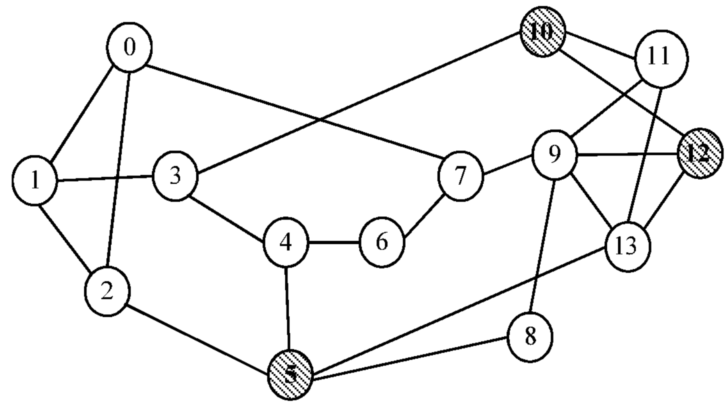
FIG. 9B illustrates another embodiment of SDN-enabled node placements in a network topology according to a basic SDN-enabled node placement scheme.
Figure 9C:
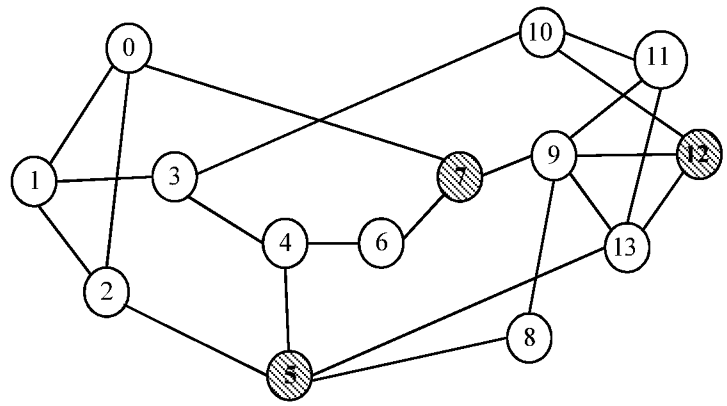
FIG. 9C illustrates an embodiment of SDN-enabled node placements in a network topology according to a first extended SDN-enabled node placement scheme.

FIGS. 9A-9C compare SDN-enabled node placements between the scheme 400 and the scheme 700. FIG. 9A illustrates an embodiment of SDN-enabled node placements in the network topology 810 according to the basic SDN-enabled node placement scheme 400. FIG. 9B illustrates another embodiment of SDN-enabled node placements in the network topology 810 according to the basic SDN-enabled node placement scheme 400. For example, both the node 9 and the node 10 provide the same coverages. FIG. 9C illustrates an embodiment of SDN-enabled node placements in the network topology 810 according to the first extended SDN-enabled node placement scheme 700. Comparing FIGS. 9A-9C, the SDN-enabled nodes are spread out when employing the scheme 700. Thus, the scheme 700 may provide better load balancing and reliability.

Figures 10A, 10B:
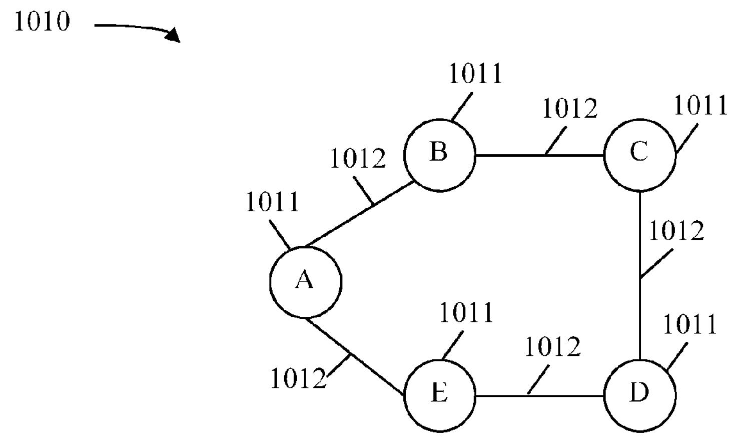
FIG. 10A is a schematic diagram of another embodiment of a network topology.
FIG. 10B is a table illustrating an embodiment of single-link failure coverages and distances between SDN-enabled node candidate locations in a network topology.

FIGS. 10A-10B illustrate a second extended scheme 800 for placing a minimum number of SDN-enabled nodes similar to the nodes 120, 121, 131, 311, 411, and 511 in a network similar to the network 100 to provide full single-link failure coverage in the network. The scheme 1000 is implemented by a network controller such as the network controller 110. The scheme 1000 is implemented to enable the employment of backup tunnels for single-link failure protection as described in the network 100. The scheme 1000 is similar to the scheme 400, but considers distances between SDN-enabled nodes and affect nodes in addition to single-link failure coverages. The scheme 1000 minimizes distances or number of hops between nodes such as the nodes 120 affected by single-link failures and corresponding designated SDN-enabled nodes. FIG. 10A is a schematic diagram of another embodiment of a network topology 1010. The scheme 1000 is applied to the network topology 1010. The network topology 1010 is similar to the network topologies 310, 410, 510, and 710. The network topology 1010 comprises a plurality of nodes 1011 similar to the nodes 120, 311, 411, 511, and 711 communicatively coupled by a plurality of links 1012 similar to the links 130, 312-316, 412, 512-516, and 712.

FIG. 10B is a table 1020 illustrating an embodiment of single-link failure coverage and distances between SDN-enabled node candidate locations in the network topology 1010. In the scheme 1000, the eligibility of the candidate locations are determined by employing the same mechanisms as in the schemes 300 and 400. Similar to the tables 320, 420, and 720, the table 720 represents candidate locations by values of 1, otherwise by values of 0. As shown, both the nodes D and E 1011 provide the same maximum coverage of 3 single-link failures. Next, the scheme 1000 computes an average distance between the node D 1011 and the affected nodes A, B, and C 1011 and an average distances between the node E 1011 and the affected nodes A, B, and C 1011 as shown in the row 1024. For example, according to the topology 1010, the node D 1011 is 2 hops away from the affected node A, 2 hops away from the affected node B 1011, and 1 hop away from the affected node C 1011. Thus, the node D 1011 comprises an average distance of 1.67 from the affect nodes A, B, and C 1011. Similarly, the node E 1011 is 1 hop away from the affected node A, 2 hops away from the affected node B 1011, and 2 hops away from the affected node C 1011. Thus, the node E 1011 comprises an average distance of 1.67 from the affect nodes A, B, and C 1011. Since both the nodes D and E 1011 provides the same average distance to the affected nods A, B, and C 1011, the scheme 1000 may select node D or E 1011. For example, the scheme 1000 selects the location of the node D 1011 as a target location for placing a first SDN switch, shown as a shaded column. Similar to the schemes 400, 500, and 700, after selected the location of the node D 1011, the scheme 1000 removes the rows 1021, 1022, and 1023 corresponding to the single-link failures covered by the node D 1011 shown by the lines 1024. Next, since the node A, B, and E provides the same single-link failure coverage, the scheme 1000 computes an average distance between each of the nodes A, B, and E to the affected node B 1011 as shown in the row 1025. Since the node B 1011 comprises the minimum distance, the scheme 1000 determines to place a second SDN switch at the location of the node B 1011 as shown by the dashed circle.

Figure 11:
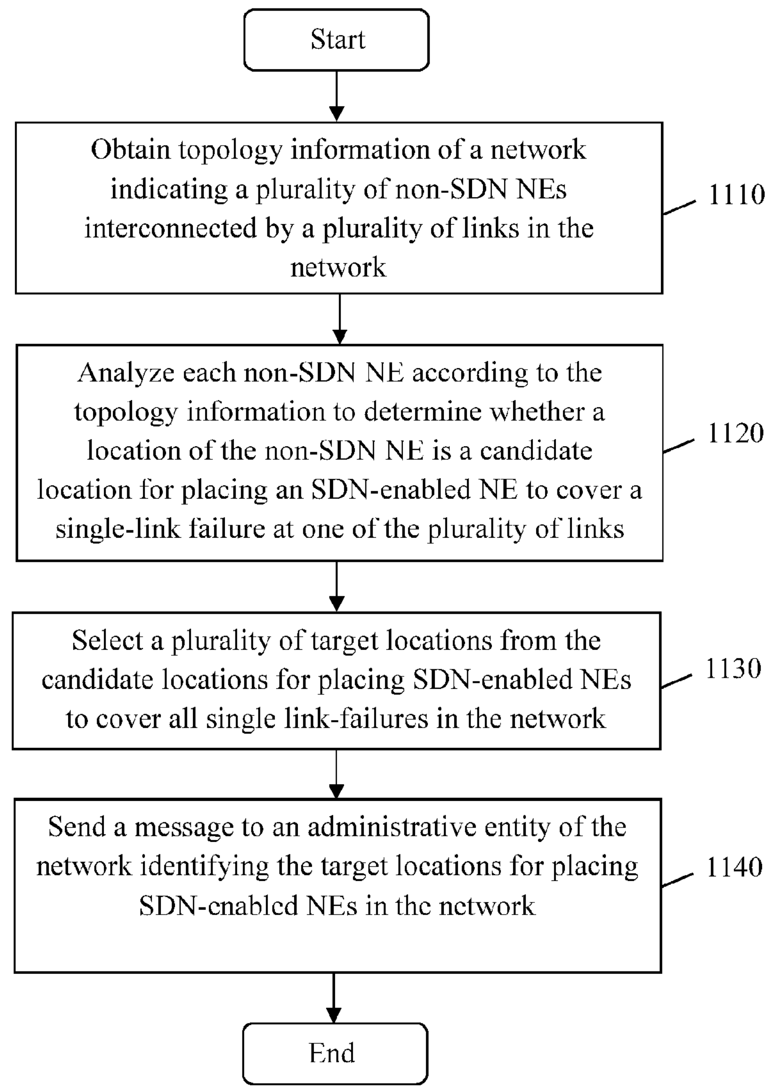
FIG. 11 is a flowchart of an embodiment of a method for placing SDN-enabled NEs in a network for single-link failure protection.

FIG. 11 is a flowchart of an embodiment of a method 1100 for placing SDN-enabled NEs in a network for single-link failure protection. The method 1100 is implemented by a network controller, such as the SDN controller 110 and the NE 200. The method 1100 is implemented when determining to employ SDN-enabled NEs for single-link failure protection. The method 1100 employs similar mechanisms as the schemes 300, 400, 500, 700, and 1000. The method 1100 may be applied to a network similar to the network 100. At step 1110, topology information of a network indicating a plurality of non-SDN NEs interconnected by a plurality of links in the network is obtained, for example, from a network topology database. At step 1120, each non-SDN NE is analyzed according to the topology information to determine whether a location of the non-SDN NE is a candidate location for placing an SDN-enabled NE to cover a single-link failure at one of the plurality of links. For example, a source non-SDN NE may forward traffic to a plurality of destination non-SDN NEs in the network by employing a same next-hop link in the network. A node location of a non-SDN NE is a candidate location when a shortest path is found from the source non-SDN NE to the non-SDN NE that excludes the next-hop link and a shortest path is found from the non-SDN NE to each of the destination non-SDN NE that excludes the next-hop link.

At step 1130, a plurality of target locations are selected from the candidate locations for placing SDN-enabled NEs to cover all single link-failures in the network. For example, the plurality of target locations is selected such that a minimum number of target locations cover all single-link failures in the network. The selection is based on maximizing single-link failure coverages as described in the schemes 300 and 400. In addition, the selection may further be performed based on maximizing link capacities as described in the scheme 500, maximizing distances between SDN-enabled NEs as described in the scheme 800, and minimizing average distances between SDN-enabled NEs and corresponding non-SDN NEs that are protected by the SDN-enabled NEs as described in the scheme 1000. To maximize single-link failure coverages, link capacities, distances between SDN-enabled NEs or to minimize average distances between SDN-enabled NEs corresponding non-SDN NEs, a suitable threshold is determined and a selection is performed to satisfy the threshold. For example, when performing maximization, a threshold may correspond to a maximum value or weight among the candidate locations. Alternatively, when performing minimization, a threshold may correspond to a minimum value or weight among the candidate locations.

At step 1140, a message is sent to an administrative entity of the network identifying the target locations for placing SDN-enabled NEs in the network. In some other embodiments, the network controller may automatically upgrade the non-SDN NE at the target locations to SDN-enabled NEs, for example, by installing SDN functionalities at the non-SDN NEs or upgrading firmware of the non-SDN NEs.

Figure 12:
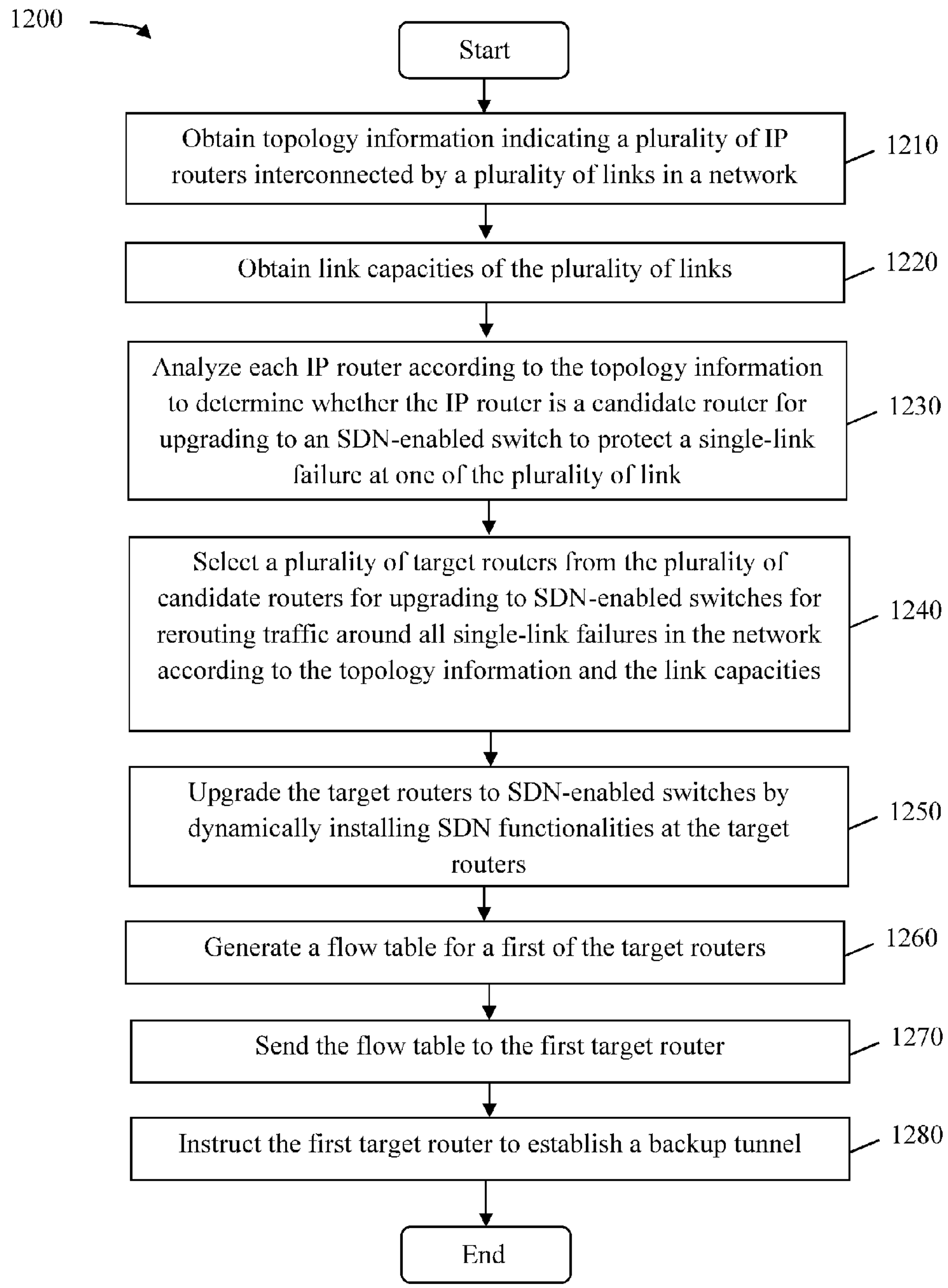
FIG. 12 is a flowchart of an embodiment of a method for upgrading non-SDN NEs to SDN-enabled NEs in a network for single-link failure protection.

FIG. 12 is a flowchart of an embodiment of a method 1200 for upgrading non-SDN NEs to SDN-enabled NEs in a network for single-link failure protection. The method 1200 is implemented by a network controller, such as the SDN controller 110 and the NE 200. The method 1200 is implemented when determining to employ SDN-enabled NEs for single-link failure protection. The method 1200 employs similar mechanisms as the schemes 500 and the method 1100. The method 1200 may be applied to an IP network similar to the network 100. At step 1210, topology information indicating a plurality of IP routers similar to the nodes 120, 121, 311, 411, and 511 interconnected by a plurality of links similar to the links 130, 312-316, 412, and 512-516 in a network is obtained by the network controller. At step 1220, link capacities of the plurality of links are obtained by the network controller. For example, the topology information and the link capacities may be received from a traffic engineering database. At step 1230, each IP router is analyzed according to the topology information to determine whether the IP router is a candidate router for upgrading to an SDN-enabled switch to protect a single-link failure at one of the plurality of links. For example, a source router may reach a plurality of destination IP routers via a same next-hop links in the network. A first of the IP routers is a candidate router when there is a first shortest path from the IP router to the source router that excludes the next-hop link and second shortest paths from the IP router to the destination routers that exclude the next-hop link. At step 1240, a plurality of target routers are selected from the plurality of candidate routers for upgrading to SDN-enabled switches for rerouting traffic around all single-link failures in the network according to the topology information and the link capacities. For example, the plurality of target routers is selected such that a minimum number of target routers may reroute traffic for all single-link failures in the network. At step 1250, the target routers are upgraded to SDN-enabled switches by dynamically installing SDN functionalities at the target routers. At step 1260, a flow table is generated for a first of the target routers. For example, the first target router corresponds to the first IP router. Thus, the flow table is generated according to the first shortest path and the second shortest paths. At step 1270, the flow table is sent to the first target router. At step 1280, an instruction to establish a backup tunnel with the source router according to the first shortest path is sent to the first target router.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network controller comprising:

a processor configured to:

obtain topology information of a network, wherein the topology information indicates a plurality of non-software-defined networking (non-SDN) network elements (NEs) interconnected by a plurality of links in the network;

analyze each non-SDN NE according to the topology information to determine whether the non-SDN NE is a candidate NE for establishing a backup tunnel to protect a single-link failure at one of the plurality of links; and select a plurality of target NEs from candidate NEs based on software-defined networking (SDN) functionalities of the candidate NEs to protect against all single link-failures in the network based on the topology information; and a transmitter coupled to the processor and configured to send a first message to a first of the target NEs to dynamically enable the SDN functionalities at the first of the target NEs in order to facilitate single-link failure protection in the network.

2. The network controller of claim 1, wherein the processor is further configured to analyze each non-SDN NE by:

obtaining routing information indicating a source NE of the plurality of non-SDN NEs reaches a plurality of destination NEs of the plurality of non-SDN NEs via a same next-hop link of the plurality of the links;

determining that the non-SDN NE is the candidate NE for establishing the backup tunnel with the source NE to protect the next-hop link when computing a first shortest path from the source NE to the non-SDN NE that excludes the next-hop link; and computing a second shortest path from the non-SDN NE to each destination NE that excludes the next-hop link.

3. The network controller of claim 1, wherein the processor is further configured to select the target NEs by determining a coverage weight value for each candidate NE according to a number of single-link failures protected by the candidate NE.

4. The network controller of claim 3, wherein the processor is further configured to select the target NEs by:

determining a first threshold based on the coverage weight values for each candidate NE; and selecting a first candidate NE corresponding to a first of the coverage weight values that satisfies the first threshold as the first of the target NEs.

5. The network controller of claim 4, wherein the processor is further configured to select the plurality of target NEs by:

re-computing a coverage weight value for remaining candidate NEs by excluding single-link failures protected by the first of the target NEs;

determining a second threshold based on the recomputed coverage weight values;

determining that a second of the candidate NEs and a third of the candidate NEs comprise a same recomputed coverage weight value that satisfies the second threshold; and selecting the second of the candidate NEs as a second of the plurality of target NEs when the second of the candidate NEs comprises a greater number of hops from the first of the target NEs than the third of the candidate NEs.

6. The network controller of claim 3, wherein the processor is further configured to select the target NEs by:

determining a threshold based on the coverage weight values;

determining that a first of the candidate NEs and a second of the candidate NEs comprise a same coverage weight value that satisfies the threshold;

determining a first distance weight value for the first of the candidate NEs by computing a first average number of hops along first shortest paths corresponding to the first of the candidate NEs;

determining a second distance weight value for the second of the candidate NEs by computing a second average number of hops along first shortest paths corresponding to the second of the candidate NEs; and selecting the first of the candidate NEs as the first of the target NEs when the first distance weight value is less than the second distance weight value.

7. The network controller of claim 3, wherein the transmitter is further configured to send a second message to the first target NE instructing the first target NE to establish backup tunnel with a corresponding source NE according to a corresponding first shortest path for rerouting traffic around a corresponding next-hop link when a single-link failure occurs at the corresponding next-hop link.

8. The network controller of claim 2, wherein the processor is further configured to generate a flow table according to the first shortest path and one of a plurality of second shortest paths corresponding to the first of the target NEs, and wherein the transmitter is further configured to send a second message to the first of the target NEs indicating the flow table.

9. The network controller of claim 1, wherein the plurality of non-SDN NEs are Internet protocol (IP) routers.

10. A method implemented by a network controller, comprising:

obtaining, via a processor of the network controller, topology information of a network, wherein the topology information indicates a plurality of non-software-defined networking (non-SDN) network elements (NEs) interconnected by a plurality of links in the network;

analyzing, via the processor, each non-SDN NE according to the topology information to determine whether a location of the non-SDN NE is a candidate location for placing a software-defined network (SDN)-enabled NE to cover a single-link failure at one of the plurality of links;

selecting, via the processor, a plurality of target locations from the candidate locations for placing SDN-enabled NEs to cover all single link-failures in the network based on the topology information; and sending, via a transmitter of the NE, a message to an administrative entity of the network identifying the target locations for placing SDN-enabled NEs in the network.

11. The method of claim 10, wherein analyzing each non-SDN NE comprises:

obtaining routing information indicating a source NE of the plurality of non-SDN NEs reaches a plurality of destination NEs of the plurality of non-SDN NEs via a same next-hop link of the plurality of the links;

computing, via the processor, a plurality of backup paths for rerouting traffic around the next-hop link according to the topology information; and determining, via the processor, that the location of the non-SDN NE is the candidate location when a first of the backup paths from the source NE to the non-SDN NE excludes the next-hop link and a second plurality of the backup paths from the non-SDN NE to the destinations NEs exclude the next-hop link.

12. The method of claim 10, wherein selecting the target locations comprises:

constructing, via the processor, a table by generating a row to represent each single-link failure in the network and generating a column to represent each non-SDN NE location;

filling, via the processor, a cell in the table with a value of one when a corresponding non-SDN NE location is the candidate location for placing the SDN-enabled NE to protect a corresponding single-link failure;

filling, via the processor, a cell in the table with a value of a zero when a corresponding non-SDN NE location is not the candidate location for placing the SDN-enabled NE to protect a corresponding single-link failure;

computing, via the processor, a coverage weight value for each column by adding values of cells in the column;

determining, via the processor, a threshold based on the coverage weight values; and selecting, via the processor, a first of the non-SDN NE locations corresponding to a first of the columns comprising a first of the coverage weight values that satisfies the threshold as a first of the target locations.

13. The method of claim 12, wherein selecting the target locations further comprises:

eliminating, via the processor, a first of the rows from the table when a cell in the first column corresponding to the first row comprises a value of one; and repeating, via the processor, coverage weight value computation and target location selection until all rows are eliminated.

14. The method of claim 11, wherein selecting the target locations further comprises:

determining that a first of the candidate locations and a second of the candidate locations cover a same number of single-link failures in the network;

computing a first distance weight value for the first of the candidate locations by computing a first average number of hops along first backup paths corresponding to a non-SDN NE located at the first candidate location;

computing a second distance weight value for the second of the candidate locations by computing a second average number of hops along first backup paths corresponding to the non-SDN NE located at the second of the candidate locations; and selecting the first of the candidate locations as the first target location when the first distance weight value is less than the second distance weight value.

15. The method of claim 10, wherein selecting the target locations further comprises:

computing, via the processor, a number of single-link failures covered by each candidate location;

determining, via the processor, a threshold based on the number of single-link failures covered by the candidate locations;

selecting, via the processor, a first of the candidate locations covering a first number of single-link failures that satisfies the threshold as a first of the target locations;

determining, via the processor, that a second of the candidate locations and a third of the candidate locations cover a same number of remaining single-link failures; and selecting, via the processor, the second of the candidate locations as a second of the target locations when the second of the candidate locations comprises a greater number of hops from the first of the target locations than the third of the candidate locations.

16. The method of claim 11, wherein the plurality of non-SDN NEs comprise Internet protocol (IP) routers, Ethernet switches, or combinations thereof.

17. A computer program product for use by a network controller, wherein the computer program product comprises computer executable instructions stored on a non-transitory computer readable medium such that when executed by a processor cause the network controller to:

obtain topology information indicating a plurality of Internet protocol (IP) routers interconnected by a plurality of links in a network;

obtain link capacities of the plurality of links;

analyze each IP router according to the topology information to determine whether each IP router is a candidate router for upgrading to a software-defined networking (SDN)-enabled switch to protect against a single-link failure at one of the plurality of links;

select a plurality of target routers from the plurality of candidate routers for upgrading to SDN-enabled switches for rerouting traffic around all single-link failures in the network according to the topology information and the link capacities; and upgrade the target routers to SDN-enabled switches by dynamically installing SDN-functionalities at the target routers.

18. The method of claim 17, wherein the instructions further cause the processor to determine that an IP router is a candidate router by:

obtaining routing information indicating a source router of the plurality of IP routers reaches a plurality of destination routers of the plurality of IP routers via a same next-hop link of the plurality of the links;

computing a first shortest path from the source router to the IP router that excludes the next-hop link;

computing a second shortest path from the IP router to an intermediate IP router of the plurality of IP routers that excludes the next-hop link; and computing a third shortest path from the intermediate IP router to a first of the destination routers that excludes the next-hop link.

19. The method of claim 18, wherein the instructions further cause the processor to select the target routers by:

determining a link bandwidth of each first shortest path according to a link capacity among links along the first shortest path;

constructing, via the processor, a table by generating a row to represent each single-link failure and generating a column to represent each IP router;

tabulating, via the processor, the link bandwidths in the table according to IP routers and single-link failures corresponding to the first shortest paths;

filling, via the processor, remaining cells in the table with values of zeros;

computing, via the processor, a coverage weight value for each column by determining a number of cells in the column with non-zero values; and computing, via the processor, a link capacity weight value for each column by adding values of cells in the column.

20. The method of claim 19, wherein the instructions further cause the processor to select the target routers:

determining, via the processor, that a first of the columns and a second of the columns comprise a same coverage weight value; and selecting an IP router corresponding to the first column as a first of the target routers when the first column comprises a greater link capacity weight value than the second column.

* * * * *